(12) United States Patent
Zhao et al.

(10) Patent No.: US 11,366,528 B2
(45) Date of Patent: Jun. 21, 2022

(54) GESTURE MOVEMENT RECOGNITION METHOD, APPARATUS, AND DEVICE

(71) Applicant: Tencent Technology (Shenzhen) Company Limited, Shenzhen (CN)

(72) Inventors: Shijie Zhao, Shenzhen (CN); Feng Li, Shenzhen (CN); Xiaoxiang Zuo, Shenzhen (CN); Jun Cheng, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 107 days.

(21) Appl. No.: 17/004,735

(22) Filed: Aug. 27, 2020

(65) Prior Publication Data

US 2020/0393911 A1 Dec. 17, 2020

Related U.S. Application Data

(63) Continuation of application No. PCT/CN2019/084630, filed on Apr. 26, 2019.

(30) Foreign Application Priority Data

Jun. 7, 2018 (CN) .......................... 201810582795.X

(51) Int. Cl.
*G06F 3/041* (2006.01)
*G06F 3/01* (2006.01)
(Continued)

(52) U.S. Cl.
CPC .............. *G06F 3/017* (2013.01); *G06F 17/12* (2013.01); *G06N 3/08* (2013.01); *G06T 13/40* (2013.01); *G06V 40/107* (2022.01); *G06V 40/28* (2022.01)

(58) Field of Classification Search
CPC ........... G06F 3/017; G06F 17/12; G06N 3/08; G06N 3/0454; G06T 13/40; G06V 40/107;
(Continued)

(56) References Cited

U.S. PATENT DOCUMENTS

| 2012/0019562 | A1* | 1/2012 | Park ...................... G06F 3/0488 345/173 |
| 2012/0068917 | A1 | 3/2012 | Huang et al. |

(Continued)

FOREIGN PATENT DOCUMENTS

| CN | 101980107 A | 2/2011 |
| CN | 102707799 A | 10/2012 |

(Continued)

OTHER PUBLICATIONS

Extended European Search Report for European Patent Application No. 19814802.5 dated Jun. 22, 2021; 9 pages.

(Continued)

*Primary Examiner* — Thuy N Pardo
(74) *Attorney, Agent, or Firm* — Crowell & Moring LLP

(57) ABSTRACT

This application discloses a method, an apparatus, and a storage medium for gesture movement recognition. The method includes: acquiring a first gesture image and a second gesture image; recognizing the first gesture image to obtain a first vector used for representing angles of finger segments in the first gesture image, and recognizing the second gesture image to obtain a second vector used for representing angles of finger segments in the second gesture image; selecting a first specified finger from a plurality of predetermined types of fingers; selecting first specified segments of a plurality of types of finger segments as needing to change segment angles in the first specified finger from the first gesture image to the second gesture image according (Continued)

to a specific gesture movement; calculating, by the server, a first total angular change amount of the first specified segments of a first specified finger according to the first vector and the second vector; and obtaining, a recognition result associated with the gesture movement according to the first total angular change amount in relation to a first preset angular change threshold.

20 Claims, 8 Drawing Sheets

(51) Int. Cl.
*G06F 17/12* (2006.01)
*G06N 3/08* (2006.01)
*G06T 13/40* (2011.01)
*G06V 40/20* (2022.01)
*G06V 40/10* (2022.01)

(58) Field of Classification Search
CPC ........ G06V 40/28; G06V 10/42; G06V 10/82; G06V 40/117; G06K 9/6271; H04M 1/72454; H04M 2250/52
USPC ............ 345/156, 173, 174; 348/49; 382/103
See application file for complete search history.

(56) References Cited

U.S. PATENT DOCUMENTS

| | | | | |
|---|---|---|---|---|
| 2012/0293544 A1* | 11/2012 | Miyamoto | .............. | G06F 3/005 345/620 |
| 2013/0021286 A1* | 1/2013 | Sudo | .................. | G06F 3/04886 345/173 |
| 2014/0168068 A1* | 6/2014 | Kim | ..................... | G06F 3/0304 345/156 |
| 2014/0185868 A1* | 7/2014 | Lee | ........................ | G06V 40/28 382/103 |
| 2015/0177842 A1 | 6/2015 | Rudenko | | |
| 2015/0358614 A1* | 12/2015 | Jin | ....................... | G02B 27/017 348/49 |
| 2016/0054859 A1* | 2/2016 | Oshima | ................. | G06F 3/0304 345/175 |
| 2016/0093038 A1* | 3/2016 | Arai | ......................... | G06T 7/20 382/103 |
| 2016/0132126 A1* | 5/2016 | van Laack | ........... | G06V 20/597 345/156 |
| 2016/0247016 A1 | 8/2016 | Ehlers et al. | | |
| 2017/0123501 A1* | 5/2017 | Kuo | ........................ | G06F 3/005 |
| 2018/0024641 A1 | 1/2018 | Mao et al. | | |
| 2019/0179417 A1* | 6/2019 | Yang | ..................... | G06V 20/64 |
| 2020/0167553 A1* | 5/2020 | Abghari | ................ | G06V 40/20 |

FOREIGN PATENT DOCUMENTS

| | | |
|---|---|---|
| CN | 105278699 A | 1/2016 |
| CN | 105787439 A | 7/2016 |
| CN | 106406518 A | 2/2017 |
| CN | 107194344 A | 9/2017 |

OTHER PUBLICATIONS

International Search Report and Written Opinion for International Application No. PCT/CN2019/084630 dated Jul. 26, 2019; 11 pages.

* cited by examiner

GESTURE MOVEMENT RECOGNITION METHOD, APPARATUS, AND DEVICE

RELATED APPLICATION

This application is a continuation application of the International PCT Application No. PCT/CN2019/084630, filed with the National Intellectual Property Administration, PRC on Apr. 26, 2019 which claims priority to Chinese Patent Application No. 201810582795X, entitled "GESTURE MOVEMENT RECOGNITION METHOD, APPARATUS, AND DEVICE" and filed with the National Intellectual Property Administration, PRC on Jun. 7, 2018, which are incorporated herein by reference in their entireties.

FIELD OF THE TECHNOLOGY

This application relates to the field of artificial intelligence technologies, and in particular, to a method, apparatus, and device, and a computer-readable storage medium for gesture movement recognition.

BACKGROUND OF THE DISCLOSURE

Human gesture skeleton recognition is a research task widely studied in the field of human-machine interaction at present. Currently, a relatively mature human gesture skeleton recognition method includes: recognizing a gesture image based on a Convolutional Neural Network (CNN); inputting the gesture image into the CNN; and outputting, by the CNN, position coordinates of joint points on a hand in the image.

Because the existing human gesture skeleton recognition method can only recognize a single gesture image, just static gestures can be recognized. However, gestures are usually dynamic in actual scenarios in the field of human-machine interaction, so the related gesture recognition technology is not capable of recognizing dynamic and ordered gesture movements.

SUMMARY

Embodiments of this application provide a method, apparatus, and device, and a related product for gesture movement recognition, making it possible to recognize a dynamic gesture movement with relatively high accuracy, thereby having a wide range of applications.

In view of this, a first aspect of this application provides a gesture movement recognition method, including:

acquiring, by a server, a first gesture image and a second gesture image;

recognizing, by the server, the first gesture image to obtain a first vector used for representing angles of finger segments in the first gesture image, and recognizing the second gesture image to obtain a second vector used for representing angles of finger segments in the second gesture image;

selecting, by the server, a first specified finger from a plurality of predetermined types of fingers;

selecting, by the server, first specified segments of a plurality of types of finger segments as needing to change segment angles in the first specified finger from the first gesture image to the second gesture image according to a specific gesture movement;

calculating, by the server, a first total angular change amount of first specified segments of at least one first specified finger according to the first vector and the second vector; and obtaining, by the server, a recognition result of the gesture movement according to the first total angular change amount and a first preset angular change threshold.

Optionally, the method further includes:

calculating, by the server, a second total angular change amount of second specified segments of at least one second specified finger according to the first vector and the second vector, wherein the at least one second specified finger does not need to change segment angles when the specified gesture movement is performed; and obtaining, by the server, the recognition result of the gesture movement according to the first total angular change amount and the first preset angular change threshold includes:

obtaining, by the server, the recognition result of the gesture movement according to the first total angular change amount, the first preset angular change threshold, the second total angular change amount, and a second preset angular change threshold.

Optionally, the method further includes:

calculating, by the server according to the first vector, a first linear regression determination coefficient corresponding to the at least one first specified finger, and calculating, according to the second vector, a second linear regression determination coefficient corresponding to the at least one first specified finger; and calculating, by the server according to the first linear regression determination coefficient and the second linear regression determination coefficient, a first determination coefficient change amount corresponding to the at least one first specified finger; and obtaining, by the server, the recognition result of the gesture movement according to the first total angular change amount and the first preset angular change threshold includes:

obtaining, by the server, the recognition result of the gesture movement according to the first total angular change amount, the first preset angular change threshold, the first determination coefficient change amount, and a third preset threshold.

Optionally, the method further includes:

calculating, by the server according to the first vector, a third linear regression determination coefficient corresponding to the at least one second specified finger, and calculating, according to the second vector, a fourth linear regression determination coefficient corresponding to the at least one second specified finger; and calculating, by the server according to the third linear regression determination coefficient and the fourth linear regression determination coefficient, a second determination coefficient change amount corresponding to the at least one second specified finger; and obtaining, by the server, the recognition result of the gesture movement according to the first total angular change amount and the first preset angular change threshold includes:

obtaining, by the server, the recognition result of the gesture movement according to the first total angular change amount, the first preset angular change threshold, the second total angular change amount, the second preset angular change threshold, the second determination coefficient change amount, and a fourth preset threshold.

Optionally, the at least one second specified finger includes a third specified finger, wherein the third specified finger comprises finger joint points which have a linear relationship when the specified gesture movement is performed; and obtaining, by the server, the recognition result of the gesture movement according to the first total angular change amount, the first preset angular change threshold, the second total angular change amount, the second preset angular change threshold, the second determination coefficient change amount, and the fourth preset threshold includes:

obtaining, by the server, the recognition result of the gesture movement according to the first total angular change amount, the first preset angular change threshold, the second total angular change amount, the second preset angular change threshold, the second determination coefficient change amount, the fourth preset threshold, a third linear regression determination coefficient corresponding to the third specified finger, and a fifth preset threshold.

Optionally, the server calculates a total angular change amount corresponding to specified segments of a specified finger in the following manner:

obtaining a difference vector through calculation according to the first vector and the second vector; and obtaining, from the difference vector, angular change amounts corresponding to the specified segments of the specified finger, and calculating a sum of the angular change amounts to obtain a total angular change amount corresponding to the specified segments of the specified finger.

Optionally, the specified gesture movement is a finger snapping movement; the at least one first specified finger is a middle finger; and the first specified segments include three finger segments on the middle finger.

Optionally, the specified gesture movement is a finger snapping movement; the at least one first specified finger is a middle finger; the first specified segments include three finger segments on the middle finger; and the at least one second specified finger include a thumb, an index finger, a ring finger, and a little finger.

Optionally, after the server determines that a user performs the specified gesture movement, the method further includes:

displaying, by the server in an interface, an animation effect corresponding to the specified gesture movement.

Optionally, the server recognizes a gesture image to obtain a corresponding vector in the following manner:

obtaining a coordinate set through recognition according to the gesture image and a convolutional neural network model, the coordinate set including position coordinates of each joint point of a hand in the recognized gesture image;

calculating, according to the position coordinates of the joint point in the coordinate set, an angle corresponding to a finger joint point; and generating, according to the angle, a vector corresponding to the recognized gesture image, the vector being used for representing the angle of the finger segment in the recognized gesture image.

Optionally, the calculating, by the server according to the position coordinates of the joint point in the coordinate set, an angle corresponding to a finger joint point includes:

calculating, by the server, according to the position coordinates of the joint point in the coordinate set, two vectors corresponding to two finger segments connected by the finger joint point; and calculating, by the server by using an arccosine function and the two vectors, the angle corresponding to the finger joint point.

A second aspect of this application provides a gesture movement recognition apparatus, including:

an acquisition module, configured to acquire a first gesture image and a second gesture image;

a recognition module, configured to: recognize the first gesture image to obtain a first vector used for representing angles of finger segments in the first gesture image; and recognize the second gesture image to obtain a second vector, the second vector being used for representing angles of finger segments in the second gesture image;

a calculation module, configured to calculate a first total angular change amount of first specified segments of at least one first specified finger according to the first vector and the second vector, the at least one first specified finger needing to change segment angles and the first specified segments needing to change angles when a specified gesture movement is performed; and a determining module, configured to obtain a recognition result of the gesture movement according to the first total angular change amount and a first preset angular change threshold.

Optionally, the calculation module is further configured to:

calculate a second total angular change amount of second specified segments of at least one second specified finger according to the first vector and the second vector, wherein the at least one second specified finger is selected from the plurality of types of fingers and the second specified segments are selected from the plurality of types of finger segments as not needing to change segment angles in the at least one second specified finger from the first gesture image to the second gesture image according to the specific gesture movement. In may be understood that the at least one second specified finger being a finger without a need to change segments angles when the specified gesture movement is performed, and the second specified segments being finger segments of the at least one second specified finger; and the determining module may be configured to:

obtain the recognition result of the gesture movement according to the first total angular change amount, the first preset angular change threshold, the second total angular change amount, and a second preset angular change threshold.

Optionally, the calculation module is further configured to:

calculate, according to the first vector, a first linear regression determination coefficient corresponding to the at least one first specified finger, and calculate, according to the second vector, a second linear regression determination coefficient corresponding to the at least one first specified finger; and calculate, according to the first linear regression determination coefficient and the second linear regression determination coefficient, a first determination coefficient change amount corresponding to the at least one first specified finger; and the determining module may be configured to:

obtain the recognition result of the gesture movement according to the first total angular change amount, the first preset angular change threshold, the first determination coefficient change amount, and a third preset threshold.

Optionally, the calculation module is further configured to:

calculate, according to the first vector, a third linear regression determination coefficient corresponding to the at least one second specified finger, and calculate, according to the second vector, a fourth linear regression determination coefficient corresponding to the at least one second specified finger; and calculate, according to the third linear regression determination coefficient and the fourth linear regression determination coefficient, a second determination coefficient change amount corresponding to the at least one second specified finger; and the determining module may be configured to:

obtain the recognition result of the gesture movement according to the first total angular change amount, the first preset angular change threshold, the second total angular change amount, the second preset angular change threshold, the second determination coefficient change amount, and a fourth preset threshold.

Optionally, the determining module is further configured to:

when the at least one second specified finger includes a third specified finger, the third specified finger being a special kind of second specified finger whose finger joint points have a linear relationship when the specified gesture movement is performed, obtain the recognition result of the gesture movement according to the first total angular change amount, the first preset angular change threshold, the second total angular change amount, the second preset angular change threshold, the second determination coefficient change amount, the fourth preset threshold, a third linear regression determination coefficient corresponding to the third specified finger, and a fifth preset threshold.

Optionally, the calculation module may be configured to:

obtaining a difference vector through calculation according to the first vector and the second vector; and obtaining, from the difference vector, angular change amounts corresponding to the specified segments of the specified finger, and calculating a sum of the angular change amounts to obtain a total angular change amount corresponding to the specified segments of the specified finger.

Optionally, the specified gesture movement is a finger snapping movement; the at least one first specified finger is a middle finger; and the first specified segments include three finger segments on the middle finger.

Optionally, the specified gesture movement is a finger snapping movement; the at least one first specified finger is a middle finger; and the first specified segments include three finger segments on the middle finger.

The at least one second specified finger include a thumb, an index finger, a ring finger, and a little finger.

Optionally, the apparatus further includes a display module, configured to:

after determining that a user performs the specified gesture movement, display, in an interface, an animation effect corresponding to the specified gesture movement.

Optionally, the recognition module may be configured to:

obtain a coordinate set through recognition according to the gesture image and a convolutional neural network model, the coordinate set including position coordinates of each joint point of a hand in the recognized gesture image;

calculate, according to the position coordinates of the joint point in the coordinate set, an angle corresponding to a finger segment; and generate, according to the angle, a vector corresponding to the recognized gesture image, the vector being used for representing the angle of the finger segments in the recognized gesture image.

Optionally, the recognition module may be configured to:

calculate, according to the position coordinates of the joint point in the coordinate set, two vectors corresponding to two segments connected by the finger joint point; and calculate, by using an arccosine function and the two vectors, the angle corresponding to the finger joint point.

A third aspect of this application provides a gesture movement recognition device, including a processor and a memory, the memory being configured to store program code, and transmit the program code to the processor; and the processor being configured to perform the steps in the gesture movement recognition method according to the first aspect according to an instruction in the program code.

A fourth aspect of this application provides a computer-readable storage medium, configured to store program code, the program code being used for performing the gesture movement recognition method according to the first aspect.

A fifth aspect of this application provides a computer program product including instructions, the computer program product, when run on a computer, causing the computer to perform the gesture movement recognition method according to the first aspect.

It can be learned from the foregoing technical solutions that the embodiments of this application have the following advantages:

In the embodiments of this application, a gesture movement recognition method is provided. In the method, a first gesture image and a second gesture image are recognized to obtain a first vector and a second vector that represent angles of finger segments; then a first total angular change amount is calculated according to the first vector and the second vector by using a mathematical model, the first total angular change amount being a total angular change amount corresponding to first specified segments of at least one first specified finger, the at least one first specified finger needing to change segment angles when a specified gesture movement is performed, and the first specified segments of the at least one first specified finger needing to change angles when the specified gesture movement is performed; and whether a user performs the specified gesture movement may be determined according to the first total angular change amount and a first preset angular change threshold, to obtain a recognition result of the gesture movement. When a user performs a specified gesture movement, angular changes of specific segments of a specific finger inevitably exist. Therefore, in the methods and applications provided in this disclosure, a dynamic gesture movement can be recognized according to angular changes of the specific segments of the specific finger in two gesture images. The gesture movement recognition method provided in this application has a wider range of applications in the field of artificial intelligence.

DESCRIPTION OF EMBODIMENTS

Figure 1:
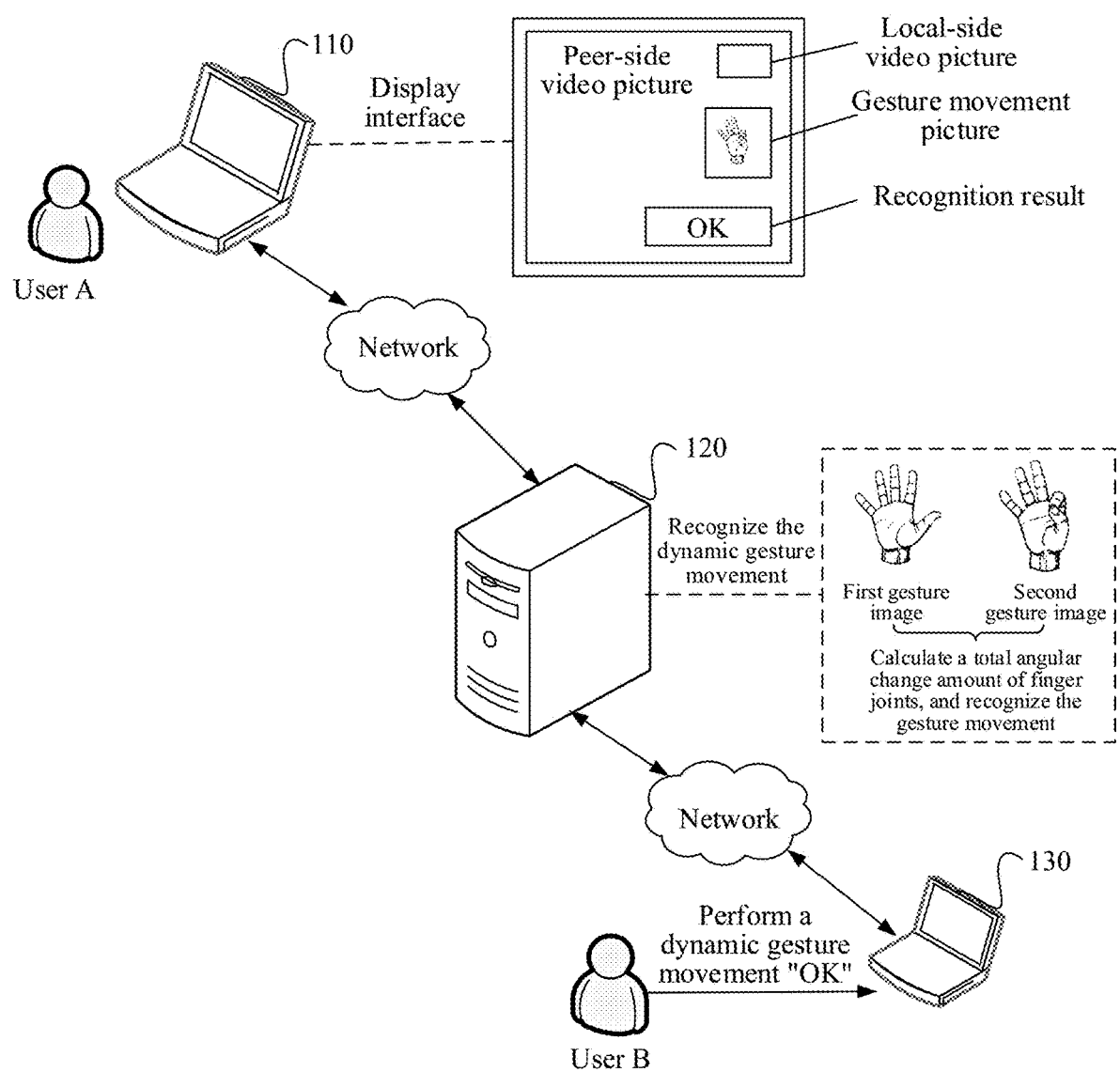
FIG. 1 is a schematic diagram of a scenario of a gesture movement recognition method according to an embodiment of this application.

To make a person skilled in the related art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the related art based on the embodiments of this application without creative efforts shall fall within the protection scope of this application.

In the specification, claims, and accompanying drawings of this application, the terms "first", "second", "third", "fourth", and the like (if existing) are intended to distinguish between similar objects rather than describe a specific sequence or a precedence order. Data used in this way is interchangeable in a suitable case, so that the embodiments of this application described herein can be implemented, for example, in a sequence other than the sequences depicted or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

For the problem that the existing gesture recognition method can recognize only static gesture movements, and cannot recognize dynamic and ordered gestures, based on the kinematic principle that when a user performs a specified gesture movement, angular changes of specified segments of a specified finger inevitably exist, the embodiments of this application provide a method for recognizing a gesture movement according to angular changes of finger segments, thereby implementing recognition of the dynamic and ordered gestures. In the method, a first gesture image and a second gesture image are recognized to obtain a first vector and a second vector that represent angles of finger segments; then a first total angular change amount of first specified segments of at least one first specified finger is calculated according to the first vector and the second vector by using a mathematical model, the at least one first specified finger needing to change segment angles when a specified gesture movement is performed, and the first specified segments being finger segments of the at least one first specified finger that need to change angles when the specified gesture movement is performed; and whether a user performs the specified gesture movement may be determined according to a relationship between the first total angular change amount and a first preset angular change threshold, to obtain a recognition result of the gesture movement.

When a user performs a specified gesture movement, angular changes of specific segments of a specific finger inevitably exist. Therefore, in the method, a dynamic gesture movement can be recognized according to angular changes of the specific segments of the specific fingers in two gesture images. The gesture movement recognition method provided in this application has a wider range of applications in the field of artificial intelligence.

The gesture movement recognition method provided in the embodiments of this application may be applied to a processing device with image processing capability. The processing device may be a terminal device such as a smartphone, a tablet computer, a personal computer (PC), a minicomputer, and a mainframe computer, or may be a server with image processing capability. The processing device may be an independent processing device, or may be a cluster including a plurality of processing devices. For example, when a relatively large volume of data needs to be processed, the gesture movement recognition method may be performed by using a cluster including a plurality of servers. In actual application, the gesture movement recognition method provided in the embodiments of this application may be jointly completed by a terminal and a server. For example, the terminal may capture gesture images; and the server may acquire the gesture images from the terminal, and recognize the gesture images, thereby determining a gesture movement performed by a user.

For ease of understanding of the technical solutions of this application, the gesture movement recognition method provided in the embodiments of this application is described below with reference to a specific application scenario.

FIG. 1 is a schematic diagram of a scenario of a gesture movement recognition method according to an embodiment of this application. As shown in FIG. 1, the application scenario includes terminals 110 and 130, and a server 120 providing a network data transmission service to the terminals. As shown in FIG. 1, the server 120 separately establishes a network connection to the terminal 110 of a user A and the terminal 130 of a user B, to provide a video communications service to the user A and the user B. In the application scenario, a terminal device is described by using a notebook computer as an example, which does not constitute a limitation to the technical solutions of this application. During a process of real-time video communication between the user A and the user B, the user B may communicate with the user A by using gesture language instead of voice. The gesture language is a language pattern in which ideas are exchanged by using dynamic gesture movements. When the user B performs a dynamic gesture movement, for example, a gesture movement "OK", the terminal 130 of the user B may capture corresponding gesture images in real time, and the gesture images may be a first gesture image and a second gesture image. The server 120 may acquire the first gesture image and the second gesture image from the terminal 130, recognize the first gesture image in real time to obtain a first vector, and recognize the second gesture image in real time to obtain a second vector, the first vector representing angles of finger segments in the first gesture image, and the second vector representing angles of finger segments in the second gesture image. The server 120 calculates a first total angular change amount of first specified segments of at least one first specified finger according to the first vector and the second vector. A recognition result of the gesture movement can be obtained in real time according to the first total angular change amount and a first preset angular change threshold. For example, if the first total angular change amount is greater than the first preset angular change threshold, it is determined that the user performs a specified gesture movement, and the specified gesture movement is the recognition result of the gesture movement.

In the application scenario, the server 120 determines that the user B performs the gesture movement "OK". To help the user A learn meaning of the gesture movement performed by the user B, the server 120 uses the meaning corresponding to the recognized gesture movement as the recognition result and transmits the recognition result to the terminal 110 of the user A. The recognition result is displayed on a display interface of the terminal 110, to help the user A view the recognition result in real time. The displayed result may be text, image, or animation and the like, and there is no limitation imposed in this disclosure.

In the application scenario, the first gesture image and the second gesture image are recognized in real time, to obtain the first vector representing the angles of the finger segments in the first gesture image and the second vector representing the angles of the finger segments in the second gesture image. The first total angular change amount of the first specified segments of the at least one first specified finger may be determined according to the first vector and the second vector, and a motion trend in the at least one first specified finger may be determined according to angular changes, so that whether the user performs the specified gesture movement may be determined. In this way, real-time recognition of the gesture movement is implemented. Compared with a conventional gesture recognition method, the gesture movement recognition method provided in this application has a wide range of applications, especially, in a scenario requiring relatively high real-time performance, such as real-time video communication and a live broadcast scenario.

The application scenario is merely an optional example of the gesture movement recognition method of this application. The gesture movement recognition method provided in the embodiments of this application may also be applied to another application scenario. The foregoing example does not constitute a limitation on the technical solutions of this application.

Subsequently, the gesture movement recognition method provided in the embodiments of this application is described below in detail with reference to the accompanying drawings.

Figure 2:
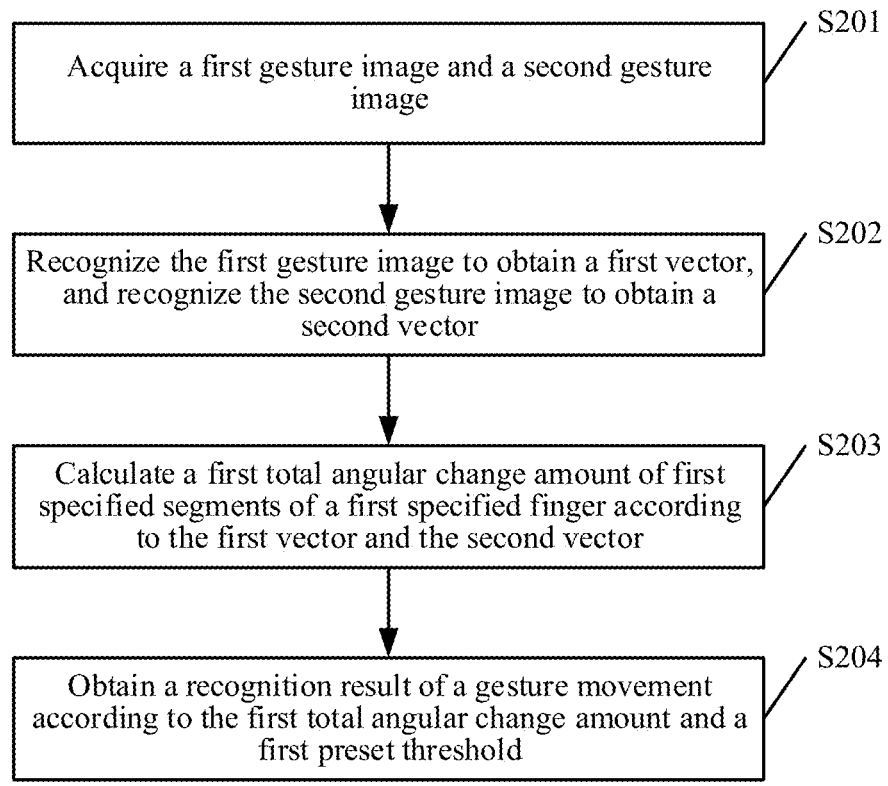
FIG. 2 is a flowchart of a gesture movement recognition method according to an embodiment of this application.

FIG. 2 is a flowchart of a gesture movement recognition method according to an embodiment of this application. Referring to FIG. 2, the method includes:

S201: A server acquires a first gesture image and a second gesture image.

A gesture image includes a gesture. Gesture recognition may be implemented by recognizing a gesture of a hand in the gesture image. When a dynamic gesture, that is, a gesture movement needs to be recognized, at least two gesture images having a time sequence relationship need to be acquired, including a first gesture image and a second gesture image.

In some possible implementations, two frames of images that have a time sequence relationship and include gestures may be acquired from a video as the first gesture image and the second gesture image. For example, the video may be recognized frame by frame, images including a hand are marked, and two consecutive frames of images are selected from the marked image frames as the first gesture image and the second gesture image. Alternatively, the first gesture image and the second gesture image may also be nonconsecutive. For example, two frames of images spaced by one frame of image may be selected from the marked image frames as the first gesture image and the second gesture image. A period of time is required for performing a gesture movement. To recognize the gesture movement more accurately and more promptly, two gesture images spaced by a period of time may be selected as the first gesture image and the second gesture image, respectively. For example, if 1 second is required for performing a gesture movement, two gesture images may be extracted from the video according to a preset time interval of 1 second as the first gesture image and the second gesture image, respectively.

In some other possible implementations, a hand is shot at different time points to obtain photos to be used as the first gesture image and the second gesture image. For example, a continuous shooting function may be used. The hand is shot at a same direction, position, and shooting angle, to generate a plurality of images. Two images are selected from the plurality of images as the first gesture image and the second gesture image. Similarly, to recognize the gesture movement more accurately and more promptly, two gesture images shot in one time period may be selected according to a preset time interval as the first gesture image and the second gesture image.

S202: The server recognizes the first gesture image to obtain a first vector, the first vector being used for representing angles of finger segments in the first gesture image, and recognizes the second gesture image to obtain a second vector, the second vector being used for representing angles of finger segments in the second gesture image.

Based on the kinematic principle described above, when a user performs a specified gesture movement, angular changes of finger segments exist, and the dynamic gesture movement can be recognized according to angular changes of specified segments of specified fingers in the two gesture images. Based on this, a processing device may first recognize angles of segments in the gesture images, so as to determine angular changes of finger segments according to the angles of the finger segments in the two gesture images. Optionally, the first gesture image may be recognized to obtain the first vector representing the angles of the finger segments in the first gesture image, and the second gesture image may be recognized to obtain the second vector representing the angles of the finger segments in the second gesture image.

Figure 3:
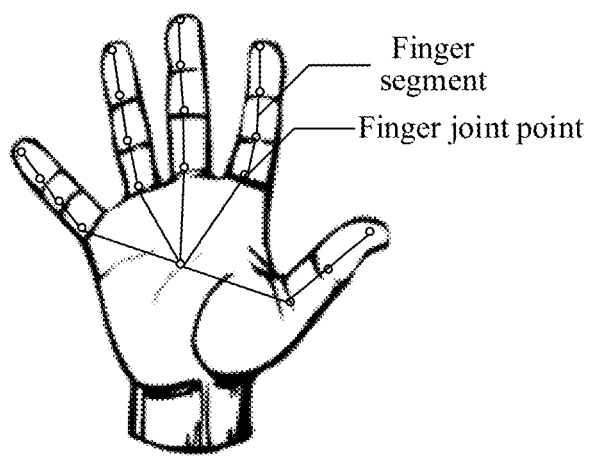
FIG. 3 is a schematic diagram of joint points and finger segments in a recognized gesture image according to an embodiment of this application.

Recognition of angles of finger segments may be implemented through deep learning of recognizing joint points and then through calculation according to position coordinates of the joint points. In some possible implementations, a coordinate set is obtained through recognition according to a gesture image and a convolutional neural network model, the coordinate set including position coordinates of each joint point of a hand in the recognized gesture image; and an angle corresponding to a finger segment is calculated according to the position coordinates of the joint point in the coordinate set. In this way, the first gesture image is inputted into the convolutional neural network model, and position coordinates of each joint point in the first gesture image may be obtained. FIG. 3 is a schematic diagram of joint points determined according to the convolutional neural network model. As shown in FIG. 3, a thumb has three joint points; an index finger, a middle finger, a ring finger, and a little finger each has four joint points; and a palm also has a joint point connected to the fingers. After joint points of the fingers are determined, angles corresponding to finger segments may be calculated according to position coordinates of the joint points in the first gesture image, and the angles corresponding to the finger segments are represented in a form of a vector, that is, the first vector. A process in which the second gesture image is recognized to obtain the second vector is similar to the process corresponding to the first gesture image, and details are not described herein again. In this disclosure, finger segment may also be referred to as segment.

The convolutional neural network model in this embodiment is a neural network model using gesture images as input and using position coordinates of joint points as output. The neural network model may be obtained through training by deep learning. In a possible implementation, a large quantity of gesture images may be acquired, and position coordinates of joint points in the gesture images are marked, to obtain a training sample. An initial convolutional neural network model is trained by using the training sample, to obtain the convolutional neural network model for recognizing gesture images.

Figure 4:
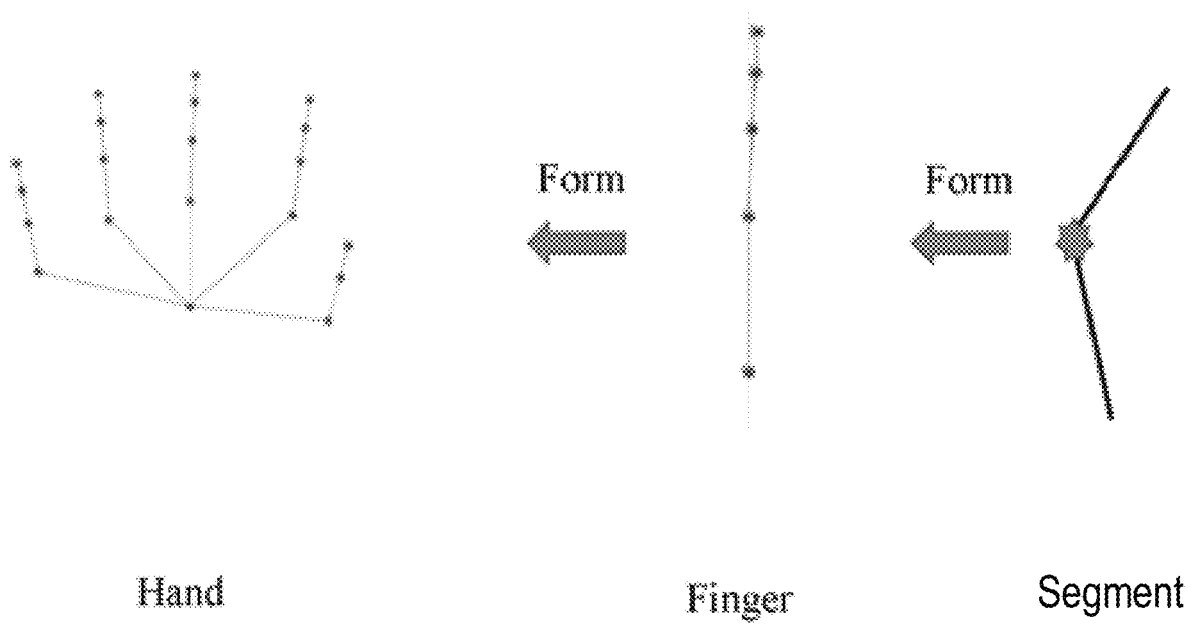
FIG. 4 is a principle diagram of calculating angles of finger segments according to an embodiment of this application.

After a coordinate set including the position coordinates of the joint points is obtained through recognition by using the convolutional neural network model, two vectors corresponding to two segments connected by a finger joint point may be calculated according to position coordinates of the joint points in the coordinate set. Subsequently, an angle corresponding to the finger joint point is calculated by using an arccosine function and the two vectors. FIG. 4 is a principle diagram of calculating angles of finger joints and angles of finger segments. Referring to FIG. 4, each finger of a hand has joint points, and for any joint point, if the joint point connects two finger segments, an included angle between vectors corresponding to the two segments may be calculated, and the included angle of the vectors is used as an angle of a finger joint point.

For ease of understanding, the vectors corresponding to the two segments connected by the joint point may be represented by using $v_1$ and $v_2$, respectively. In this case, the angle $\theta$ of the finger joint point may be calculated by using the following formula:

$$\theta = a\cos\left(\frac{v_1 \cdot v_2}{|v_1||v_2|}\right) \quad (1)$$

where $v_1 \cdot v_2$ represents an inner product of the vectors, $|v_1|$ and $|v_2|$ represent modulus values of $v_1$ and $v_2$, respectively, and a cos is the arccosine function.

In one embodiment, in this step, the sequence for recognizing the first gesture image and the second gesture image may be random. The first gesture image and the second gesture image may be simultaneously recognized, or may be recognized according to a predetermined sequence.

S203: The server calculates a first total angular change amount of first specified segments of at least one first specified finger according to the first vector and the second vector.

The at least one first specified finger is selected from a plurality of predetermined types of fingers which needs to change segments angles when a specified gesture movement is performed. The first specified segments are selected from the plurality of types of finger segments as needing to change segment angles in the at least one first specified finger from the first gesture image to the second gesture image according to a specific gesture movement. That is, if the user intends to perform the specified gesture movement, it is necessary for the user to move the at least one first specified finger, causing the first specified segments to change angles. In one embodiment, the at least one first specified finger and the first specified segments may be predetermined for each gesture movement and the determination may be performed by the server.

In this embodiment, based on differences of behavior habits of users, when a same gesture movement is performed, different users may have different implementations or motions. To improve a recognition rate of gesture movements, for different implementations of a same gesture movement, first specified fingers used for determining whether a gesture movement is performed are introduced and determined.

For ease of understanding the technical solutions of this application, the at least one first specified finger and the first specified segments are described with reference to optional examples.

An example in which a gesture movement "admiration" is performed is used for description. For recognition of the gesture movement "admiration" and for different implementations of the gesture movement, different first specified fingers and different first specified segments may be set.

In an implementation, when the gesture "admiration" is performed, if a behavior habit of a user is to start performing the gesture "admiration" from a fist-making state, when the gesture movement is performed, the thumb changes from a bent state into a strengthened state. It can be learned that the thumb is a finger needing to change segment angles when the gesture "admiration" is performed. Therefore, the thumb is determined as the at least one first specified finger. Furthermore, angles of the two segments on the thumb both need to change, so that the two segments of the thumb are determined as first specified segments.

In another implementation, if a behavior habit of a user is to start performing the gesture "admiration" from a reaching-out state, when the gesture movement is performed, the thumb does not need to change, but the index finger, the middle finger, the ring finger, and the little finger change from a strengthened state into a bent state. It can be learned that the index finger, the middle finger, the ring finger, and the little finger are fingers needing to change segment angles when the gesture "admiration" is performed, and the index finger, the middle finger, the ring finger, and the little finger may be determined as first specified fingers. Correspondingly, finger segments of the index finger, the middle finger, the ring finger, and the little finger needing to change angles when the gesture "admiration" is performed may be determined as first specified segments.

Another example in which a gesture movement "Yeah" is performed is used for description. For recognition of the gesture movement "Yeah" and for different implementations of the gesture movement, different first specified fingers and different first specified segments may be set.

In an implementation, when the gesture "Yeah" is performed, the index finger and the middle finger change from a strengthened state into a bent state. It can be learned that the index finger and the middle finger are fingers needing to change segment angles when the gesture "Yeah" is performed. Therefore, the index finger and the middle finger are determined as first specified fingers. Further, all angles of three segments of the index finger and three segments of the middle finger need to change, so that the three segments of the index finger are determined as first specified segments corresponding to the index finger, and the three segments of the middle finger are determined as first specified segments corresponding to the middle finger.

In another implementation, when the user starts performing the gesture "Yeah" from a reaching-out state, the index finger and the middle finger do not need to change, and the thumb, the ring finger, and the little finger change from a strengthened state into a bent state. The thumb, the ring finger, and the little finger may be determined as first specified fingers. Correspondingly, segments of the thumb, the ring finger, and the little finger needing to change angles may be determined as corresponding first specified segments.

In still another implementation, the user may also start performing the gesture "Yeah" from a state of reaching out the index finger. In this case, the "middle finger" is a finger needing to change segment angles when the gesture "Yeah" is performed. The middle finger may be determined as at least one first specified finger, and three segments of the middle finger may be determined as first specified segments. The first vector includes angles of all segments corresponding to all fingers, and the second vector includes angles of all segments corresponding to all fingers of the same hand. Therefore, the first total angular change amount of the first specified segments of the at least one first specified finger may be calculated according to the first vector and the second vector. In some possible implementations of this embodiment, a difference vector may be calculated according to the first vector and the second vector; then angular change amounts corresponding to the first specified segments of the at least one first specified finger may be obtained from the difference vector; and a sum of the angular change amounts is calculated to obtain the first total angular change amount corresponding to the first specified segments of the at least one first specified finger.

There may be one or more first specified fingers. When there is one first specified finger, a first total angular change amount of first specified segments in the finger is calculated. When there are a plurality of first specified fingers, for each of the specified fingers, a first total angular change amount of first specified segments of the at least one first specified finger is separately calculated.

When a specified gesture movement is performed, in addition to that angles of segments of at least one first specified finger change, segment angles of another finger may also change. The change of angles of segments of the other finger causes some interference to the recognition of the specified gesture movement. For example, the at least one first specified finger of a gesture movement A comprises an index finger and a middle finger, and at least one first specified finger of another gesture movement B comprises a middle finger. If a specified gesture movement is A, when A is recognized, a total angular change amount of segments of the index finger in addition to the middle finger is also calculated to distinguish gesture movement A from gesture movement B, and avoid a case that the gesture movement B is mistakenly recognized as the gesture movement A, thereby improving accuracy in the gesture movement recognition.

Furthermore, based on the above description, a finger without a need to change segment angles when a specified gesture movement is performed may be recorded as at least one second specified finger, and finger segments of the at least one second specified finger may be recorded as second specified segments. In one embodiment, the at least one second specified finger and the second specified segments may be predetermined for each gesture movement and the determination may be performed by the server.

A second total angular change amount of the second specified segments of the at least one second specified finger is calculated according to the first vector and the second vector. Similar to the at least one first specified finger, there may also be one or more second specified fingers. When there are a plurality of second specified fingers, for each of the at least one second specified finger, a second total angular change amount of second specified segments of the at least one second specified finger need to be separately calculated.

A method for calculating a second total angular change amount is similar to the method for calculating a first total angular change amount. A difference vector is calculated according to the first vector and the second vector; then angular change amounts corresponding to specified segments of a specified finger are obtained from the difference vector; and a sum of the angular change amounts is calculated to obtain a total angular change amount corresponding to the specified segments of the specified finger. If angular change amounts of the first specified segments of the at least one first specified finger are obtained, a calculated total angular change amount is the first total angular change amount; and if angular change amounts of the second specified segments of the at least one second specified finger are obtained, a calculated total angular change amount is the second total angular change amount.

S204: The server obtains a recognition result of the gesture movement according to the first total angular change amount and a first preset angular change threshold.

The first preset angular change threshold is a standard value used for measuring a volume of the first total angular change amount of the first specified segments of the at least one first specified finger. If the first total angular change amount is greater than the standard value, it indicates that the first total angular change amount is relatively large, and changes of the first specified segments of the at least one first specified finger reach a threshold to determine the specified gesture movement is performed. Based on this, it can be determined that the user performs the specified gesture movement, and the specified gesture movement can be used as the recognition result of the gesture movement.

In the foregoing implementation, if the first total angular change amount is greater than the first preset angular change threshold, it is determined that the user performs the specified gesture movement; otherwise, it is determined that the user does not perform the specified gesture movement.

In another possible implementation of this application, there may also be a case that when the first total angular change amount is less than the preset threshold, it is determined that the user performs the specified gesture movement; otherwise, it is determined that the user does not perform the specified gesture movement. During implementation, a judgment condition for determining whether a specified gesture movement is performed may be set according to an actual service situation.

Further, to improve accuracy in gesture movement recognition, the recognition result of the gesture movement may be obtained according to the first total angular change amount, the first preset angular change threshold, the second total angular change amount, and a second preset angular change threshold. Optionally, the second total angular change amount may be determined based on the determining of the first total angular change amount, to determine whether the user performs the specified gesture movement. In some possible implementations of this embodiment, if the first total angular change amount is greater than the first preset angular change threshold, and the second total angular change amount is less than the second preset angular change threshold, it is determined that the user performs the specified gesture movement.

The second preset angular change threshold is a standard value used for measuring the second total angular change amount of the second specified segments of the at least one second specified finger. If the second total angular change amount is less than the standard value, it indicates that the second total angular change amount is relatively small, and the second specified segments of the at least one second specified finger may be considered to have no movement. In this case, a change trend of the first specified segments of the at least one first specified finger matches with a change trend when the specified gesture movement is performed, and changes of the second specified segments of the at least one second specified finger are relatively small and may be ignored, it can be determined that the user performs the specified gesture movement. This implementation effectively reduces the interference caused by small unintentional finger movement.

In some cases, after it is determined that the user performs the specified gesture movement, an animation effect corresponding to the specified gesture movement may further be displayed in an interface, to enhance interactive experience. For example, after a user performs a gesture movement of "making a call", an animation effect of a telephone corresponding to "making a call" may be displayed in an interface. Alternatively, a corresponding sound effect may be configured for a specified gesture movement.

In view of the above, in the embodiments of this application, a gesture movement recognition method is provided. In the method, a first gesture image and a second gesture image are recognized to obtain a first vector and a second vector that represent angles of finger segments; then a first total angular change amount is calculated according to the first vector and the second vector by using a mathematical model, the first total angular change amount being a total angular change amount corresponding to first specified segments of at least one first specified finger, the at least one first specified finger being a finger needing to change segment angles when a specified gesture movement is performed, and the first specified segments being finger segments of the at least one first specified finger that need to change angles when the specified gesture movement is performed; and a recognition result of the gesture movement may be obtained according to the first total angular change amount and a first preset angular change threshold. When a user performs a specified gesture movement, angular changes of specific segments of a specific finger happens. Therefore, in the method, a dynamic gesture movement can be recognized according to angular changes of the specific segments of the specific finger in two gesture images. The gesture movement recognition method provided in this application has a wider range of applications in the field of artificial intelligence.

In the foregoing embodiment, recognition of a specified gesture movement is implemented based on angular changes of specified segments of a specified finger. When a user performs a gesture movement, not only angles of finger segments change, but also a linear relationship of a finger changes. For example, when a finger changes from a strengthened state into a bent state, a relatively large change occurs in a linear relationship of the finger. To further improve accuracy of gesture movement recognition, a gesture movement performed by a user may also be recognized based on recognition of angular changes of segments according to a change of a linear relationship of a specified finger. The linear relationship of the specified finger may be represented by a determination coefficient obtained through linear regression performed on specified joint points of the specified finger. Whether the user performs the specified gesture movement may be further determined by calculating a determination coefficient change amount corresponding to the specified finger. Subsequently, another implementation of the gesture movement recognition method provided in the embodiments of this application is described with reference to the accompanying drawings. The implementation uses the embodiment shown in FIG. 2 as a basis. As such, in this embodiment, only differences between this embodiment and the embodiment shown in FIG. 2 are described. For other same contents, reference may be made to the embodiment shown in FIG. 2, and details are not described herein again.

Figure 5:
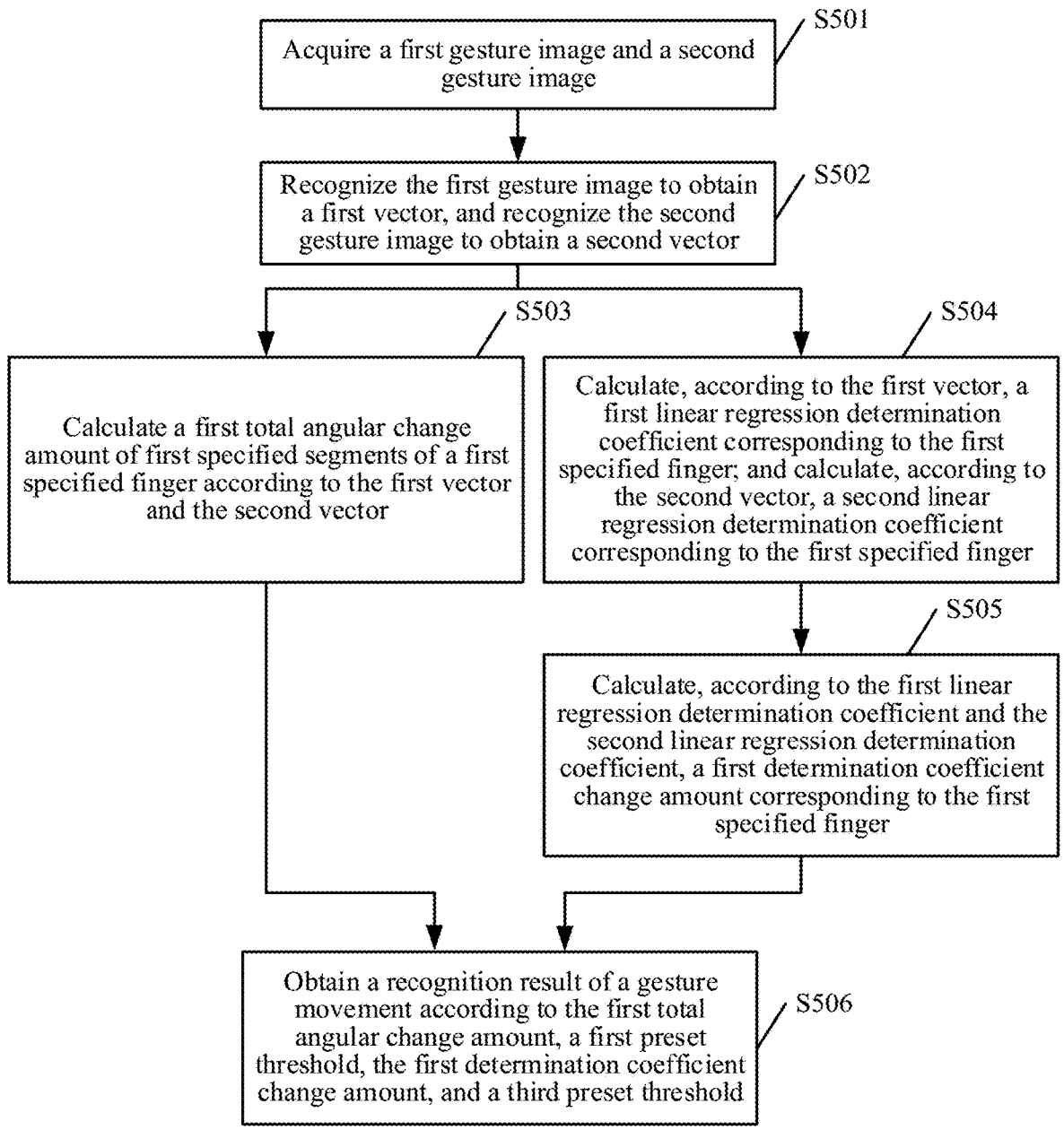
FIG. 5 is a flowchart of a gesture movement recognition method according to an embodiment of this application.

FIG. 5 is a flowchart of a gesture movement recognition method according to this embodiment. Referring to FIG. 5, the method includes:

S501: A server acquires a first gesture image and a second gesture image.

S502: The server recognizes the first gesture image to obtain a first vector, and recognizes the second gesture image to obtain a second vector.

S503: The server calculates a first total angular change amount of first specified segments of at least one first specified finger according to the first vector and the second vector.

For details of S501 to S503, reference may be made to descriptions of related content in S201 to S203.

S504: The server calculates, according to the first vector, a first linear regression determination coefficient corresponding to the at least one first specified finger, and calculates, according to the second vector, a second linear regression determination coefficient corresponding to the at least one first specified finger.

After position coordinates of joint points in the gesture images are determined, regression may be performed on joint points of each finger, to obtain a corresponding regression equation. When a linear relationship of a finger changes, a goodness of fit of a regression equation corresponding to the finger may also change significantly. In statistics, a goodness of fit of a regression equation may be determined by using a determination coefficient. In some cases, a residual quadratic sum may alternatively be used for reflecting the goodness of fit. The residual quadratic sum is related to an absolute magnitude of an observed value. For two groups of data having a relatively large absolute value difference, a goodness of fit cannot be reflected accurately. On the other hand, relativization processing is performed on a determination coefficient based on the residual quadratic sum method, and an effect from an absolute value on the determination coefficient is relatively small, so that the determination coefficient can accurately reflect the goodness of fit.

A calculation process of the goodness of fit is described below in detail.

If a y-direction (or y-axis) coordinate of each joint point in the gesture images is represented by using $y_i$, and a coordinate of a predicted point of the joint point that is obtained through linear regression is represented by using $f_i$, a residual quadratic sum $SS_{res}$ may be calculated according to $y_i$ and $f_i$, and reference may be made to the following formula:

$$SSres = \sum_i (y_i - f_i)^2 \qquad (2)$$

After each y-direction coordinate $y_i$ is obtained, an average value $\bar{y}$ of the y-direction coordinates)), may also be calculated. A total quadratic sum $SS_{tot}$ may be calculated according to the y-direction coordinates $y_i$ and the average value $\bar{y}$. For an optional calculation process, reference may be made to a formula (3) and a formula (4):

$$\bar{y} = \frac{1}{n}\sum_{i}^{n} y_i \qquad (3)$$

$$SS_{tot} = \sum_{i}(y_i - \bar{y})^2 \qquad (4)$$

where n is a quantity of the joint points included in the finger.

After the total quadratic sum $SS_{tot}$ and the residual quadratic sum $SS_{res}$ are calculated, a determination coefficient $R^2$ may be calculated according to the total quadratic sum and the residual quadratic sum, and reference may be made to the following formula:

$$R^2 = 1 - \frac{SS_{res}}{SS_{tot}} \qquad (5)$$

In this embodiment, y-direction coordinates of joint points of the at least one first specified finger may be determined according to the first vector, and a determination coefficient may be calculated according to the coordinates and coordinates of predicted points obtained through regression. The determination coefficient based on the first vector is the first linear regression determination coefficient. Similar to the first linear regression determination coefficient, y-direction coordinates of joint points of the at least one first specified finger may be determined according to the second vector, and a determination coefficient may be calculated according to the coordinates and coordinates of predicted points obtained through regression. The determination coefficient based on the second vector is the second linear regression determination coefficient. An order for calculating the first linear regression determination coefficient and the second linear regression determination coefficient does not affect implementation of the embodiments of this application, and a corresponding order may be set according to a requirement.

S505: The server calculates, according to the first linear regression determination coefficient and the second linear regression determination coefficient, a first determination coefficient change amount corresponding to the at least one first specified finger.

The first linear regression determination coefficient and the second linear regression determination coefficient may be considered as determination coefficients of the joint points of the at least one first specified finger at different time points. A first determination coefficient change amount corresponding to the at least one first specified finger may be calculated according to the first linear regression determination coefficient and the second linear regression determination coefficient. In a possible implementation, subtraction may be performed on the first linear regression determination coefficient and the second linear regression determination coefficient, and the first determination coefficient change amount is obtained according to a difference. For example, an absolute value of the difference may be used as the first determination coefficient change amount. In another possible implementation of this embodiment, the first determination coefficient change amount may alternatively be calculated in other manners, for example, by obtaining a quotient.

S505 is performed after S504, and a sequence for performing S503 may be random. In some possible implementations, S503, and S504 and S505 may alternatively be divided into two paths for simultaneous execution. In some other possible implementations, S503, S504 and S505 may alternatively be performed according to a predetermined order, for example, first performing S504 and S505, and then performing S503.

S506: The server obtains the recognition result of the gesture movement according to the first total angular change amount, the first preset angular change threshold, the first determination coefficient change amount, and a third preset threshold.

For details of the first preset angular change threshold, reference may be made to descriptions of related content of S204, and details are not described herein again.

The third preset threshold is a standard value used for measuring the first determination coefficient change amount. The recognition result of the gesture movement may be obtained according to a relationship between the first total angular change amount and the first preset angular change threshold and a relationship between the first determination coefficient change amount and the third preset threshold.

In some possible implementations of this embodiment, if the first determination coefficient change amount is greater than the third preset threshold, it indicates that the first determination coefficient change amount is relatively large, and a position distribution of the joint points of the at least one first specified finger changes. Based on angles of the finger segments and the position distribution of the joint points, when the first total angular change amount is greater than the first preset angular change threshold, and the first determination coefficient change amount is greater than the third preset threshold, it can be determined that the user performs a specified gesture movement, and the specified gesture movement can be used as the recognition result of the gesture movement.

Furthermore, to improve recognition accuracy, a regression coefficient in the at least one second specified finger may also be calculated, a position distribution of joint points of the at least one second specified finger may be determined, and whether the specified gesture movement is performed may be determined according to a change of the position distribution of the joint points of the at least one second specified finger. That is, the recognition result of the gesture movement is obtained according to the first total angular change amount, the first preset angular change threshold, the second total angular change amount, the second preset angular change threshold, the first determination coefficient change amount, the third preset threshold, the second determination coefficient change amount, and a fourth preset threshold.

Optionally, in S504, a third linear regression determination coefficient corresponding to the at least one second specified finger may also be calculated according to the first vector, and a fourth linear regression determination coefficient corresponding to the at least one second specified finger may be calculated according to the second vector. Correspondingly, in S505, the second determination coefficient change amount corresponding to the at least one second specified finger needs to be calculated according to the third linear regression determination coefficient and the fourth linear regression determination coefficient. Correspondingly, in S506, all of the first total angular change amount, the second total angular change amount, the first determination coefficient change amount, and the second determination coefficient change amount need to be checked. Optionally, if the first total angular change amount is greater than the first preset angular change threshold, the second total angular change amount is less than the second preset angular change threshold, the first determination coefficient change amount is greater than the third preset threshold, and the second determination coefficient change amount is less than the fourth preset threshold, it is determined that the user performs the specified gesture movement.

The fourth preset threshold is a standard value used for measuring the second determination coefficient change amount. If the second determination coefficient change amount is less than the fourth preset threshold, it indicates that the second determination coefficient change amount corresponding to the at least one second specified finger is relatively small, and the change of the position distribution of the joint points of the at least one second specified finger is relatively small, that is, the finger does not have a relatively big movement.

When there are a plurality of second specified fingers, if all second determination coefficient change amounts of the at least one second specified finger are less than the fourth preset threshold, it is then determined that fingers except the at least one first specified finger do not have relatively big movements. In the meantime, the first total angular change amount being greater than the first preset angular change threshold indicates that the at least one first specified finger having a relatively big movement. Based on this, it can be determined that the user performs the specified gesture movement. Determining of the second determination coefficient change amounts of the at least one second specified finger may be implemented in a plurality of manners. One implementation is that: the second determination coefficient change amounts of the at least one second specified finger are compared with the fourth preset threshold for determining, respectively; and another implementation is that: the second determination coefficient change amounts of the at least one second specified finger are compared with each other, to determine a maximum value of the second determination coefficient change amounts, and the maximum value is compared with the fourth preset threshold, to determine whether the second determination coefficient change amounts are less than the fourth preset threshold.

In some cases, analysis and judgement on a finger having a specific characteristics in the specified gesture movement, for example, a finger always having a linear relationship, may be conducted, to determine whether the specified gesture movement is performed. In this way, accuracy in recognition of the specified gesture movement may further be improved. Optional recognition processes are described below in detail.

In some possible implementations of this embodiment, it is assumed that the at least one second specified finger includes a third specified finger, the third specified finger being a special kind of second specified finger whose finger joint points have a linear relationship when the specified gesture movement is performed. In one embodiment, the third specified finger may be predetermined for each gesture movement. Because the joint points of the third specified finger have a linear relationship, when regression is performed on the joint points of the third specified finger to obtain a corresponding regression equation, the regression equation shall have a relatively high goodness of fit. The goodness of fit may be represented by a determination coefficient. Therefore, based on determining on a total angular change amount and a determination coefficient change amount, a third linear regression determination coefficient corresponding to the third specified finger may also be determined, to determine whether the specified gesture movement is performed. In some possible implementations, the recognition result of the gesture movement is obtained according to the first total angular change amount, the first preset angular change threshold, the second total angular change amount, the second preset angular change threshold, the first determination coefficient change amount, the third preset threshold, the second determination coefficient change amount, the fourth preset threshold, the third linear regression determination coefficient corresponding to the third specified finger, and a fifth preset threshold.

Optionally, if the first total angular change amount is greater than the first preset angular change threshold, the second total angular change amount is less than the second preset angular change threshold, the first determination coefficient change amount is greater than the third preset threshold, the second determination coefficient change amount is less than the fourth preset threshold, and the third linear regression determination coefficient corresponding to the third specified finger is greater than the fifth preset threshold, it is determined that the user performs the specified gesture movement, and the specified gesture movement may be used as the recognition result of the gesture movement.

The fifth preset threshold is a standard value used for measuring the third linear regression determination coefficient amount corresponding to the third specified finger. If the third linear regression determination coefficient corresponding to the third specified finger is greater than the fifth preset threshold, it indicates that the third linear regression determination coefficient corresponding to the third specified finger is relatively large, a goodness of fit is relatively high, and there is a relatively high probability that the third specified finger has a linear relationship.

In some possible implementations of this embodiment, there may be one or more third specified fingers. When there are a plurality of third specified fingers, an average value of third linear regression determination coefficients corresponding to the third specified fingers may also be determined. Optionally, based on that the first total angular change amount is greater than the first preset angular change threshold, the second total angular change amount is less than the second preset angular change threshold, the first determination coefficient change amount is greater than the third preset threshold, and the second determination coefficient change amount is less than the fourth preset threshold, if the average value of the third linear regression determination coefficients corresponding to the third specified fingers is greater than the fifth preset threshold, it is determined that the user performs the specified gesture movement.

In the foregoing embodiment, the first preset angular change threshold, the second preset angular change threshold, the third preset threshold, the fourth preset threshold, and the fifth preset threshold may be set according to empirical values. For different gesture movements, the preset thresholds may be different. No limitation is imposed in this embodiment. In this embodiment, the recognition result of the gesture movement may be obtained according to the first total angular change amount and the first preset angular change threshold. Based on this, a more accurate recognition result of the gesture movement may be obtained through determining with reference to any combination of the second total angular change amount and the second preset angular change threshold, the first determination coefficient change amount and the third preset threshold, the second determination coefficient change amount and the fourth preset threshold, and the third linear regression determination coefficient and the fifth preset threshold.

In view of the above, the embodiments of this application provide a gesture movement recognition method. In the method, based on determining on angular change of specified segments of a specified finger, determining on a determination coefficient change amount corresponding to the specified finger is added; a change of position distribution of joint points of the specified finger may be determined according to the determination coefficient change amount corresponding to the specified finger; and whether the user performs the specified gesture movement may be further determined based on the change of the position distribution, thereby improving accuracy in gesture movement recognition.

To make it easier to understand the technical solutions of this application, the gesture movement recognition method provided in the embodiments of this application is described below with reference to an optional application scenario.

Figure 6:
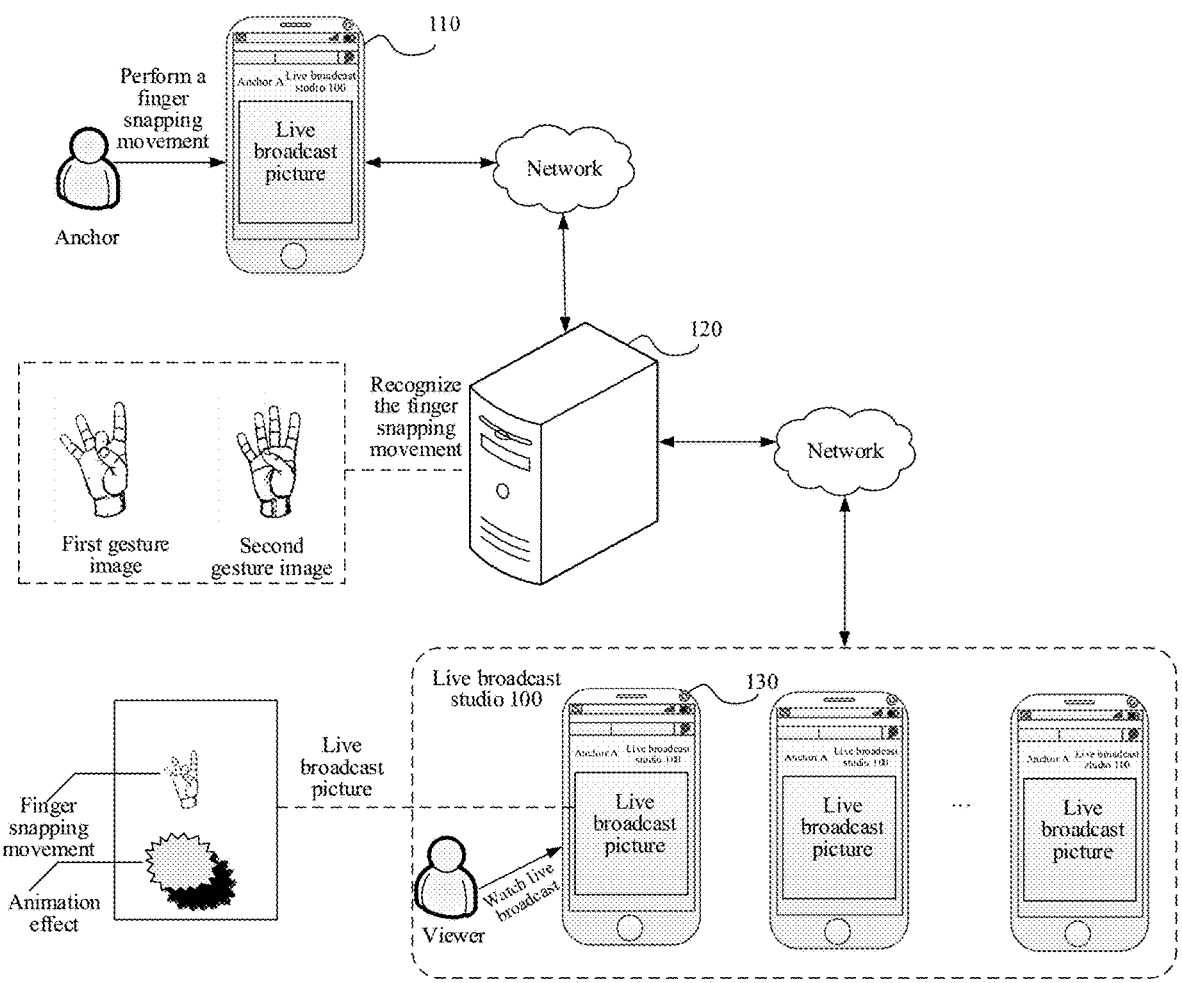
FIG. 6 is a schematic diagram of a gesture movement recognition method applied to a live broadcast scenario according to an embodiment of this application.

FIG. 6 is a schematic diagram of an application scenario of a gesture movement recognition method according to an embodiment of this application. As shown in FIG. 6, the application scenario is a real-time video live broadcast scenario, and the application scenario includes a terminal 110, a server 120, and a terminal 130. The terminal 110 is a terminal corresponding to an anchor, the terminal 130 is a terminal corresponding to a viewer, and the server 120 is a live broadcast server. The live broadcast server 120 establishes a network connection with the terminal 110 and the terminal 130, so as to provide corresponding live broadcast services. An anchor A may apply to open a live broadcast studio. In the scenario, if the anchor A opens a live broadcast studio 100, when the anchor A performs live broadcast by using the terminal 110, all terminals accessing the live broadcast studio can receive content of the live broadcast. As shown in FIG. 6, the viewer may watch the content of the live broadcast by entering the live broadcast studio of the anchor A by using the terminal 130. There may be one or more terminals of viewers. The terminals of the viewers may be located in different areas, and the terminals of the viewers may also access different local area networks. Terminals of viewers in a live broadcast studio 100 shown in FIG. 6 are merely an optional example of this application, and do not represent an actual location relationship of the terminals.

The anchor may perform various gesture movements during a live broadcast. The gesture movements performed by the anchor are recognized and corresponding animation effects are displayed according to the recognized gesture movements, to improve interactivity. A process of recognizing a gesture movement may be independently completed by the terminal 110. Optionally, the terminal 110 corresponding to the anchor captures gesture images, the gesture images including a first gesture image and a second gesture image; and then recognizes the gesture movement performed by the anchor based on information such as angular changes of finger segments in the gesture images. When a specified gesture movement is recognized, the terminal 110 may display a corresponding animation effect in an interface.

In the actual application, gesture movement recognition may also be completed by the server. As shown in FIG. 6, the anchor performs a finger snapping movement; the terminal 110 corresponding to the anchor captures gesture images in real time, the gesture images including a first gesture image and a second gesture image; the server 120 acquires the first gesture image and the second gesture image from the terminal corresponding to the anchor, and recognizes the first gesture image and the second gesture image in real time, to obtain a first vector and a second vector. A first total angular change amount of first specified segments of at least one first specified finger, a second total angular change amount of second specified segments of at least one second specified finger, a first determination coefficient change amount corresponding to the at least one first specified finger, a second determination coefficient change amount corresponding to the at least one second specified finger, and the like may be calculated according to the first vector and the second vector. According to the total angular change amounts and the determination coefficient change amounts, it is determined that the anchor performs the finger snapping movement. When determining that the user performs the finger snapping movement, the server 120 may return a corresponding animation effect to the terminal 110 corresponding to the anchor and the terminal 130 corresponding to the viewer. The terminal 110 corresponding to the anchor and the terminal 130 corresponding to the viewer display the animation effect in interfaces, for the user to watch, thereby enhancing interactivity.

For ease of understanding of a process of recognizing a gesture movement, gesture movement recognition is described below in detail with reference to the finger snapping movement.

For a specified gesture movement, namely, the finger snapping movement, at least one first specified finger is a middle finger, and first specified segments include three finger segments on the middle finger. Second specified fingers are: a thumb, an index finger, a ring finger, and a little finger. The second specified segments respectively are: two finger segments of the thumb, three finger segments of the index finger, three finger segments of the ring finger, and three finger segments of the little finger.

First, angles of finger segments may be calculated according to gesture images. Two consecutive frame images including a hand may be acquired from a video as a first gesture image and a second gesture image. Joint points in the gesture images may be recognized by using a pre-trained convolutional neural network model. Optionally, the first gesture image is recognized, and angles of finger segments are calculated, and a first vector is obtained. In one embodiments, angles of 14 segments may be calculated according to the finger segments and the corresponding joint points, so that the first vector representing the angles of the finger segments in the first gesture image is a 14-dimensional vector. Similarly, the second gesture image is recognized, and angles of segments are calculated, to obtain a second vector. The second vector representing the angles of the finger segments in the second gesture image is a 14-dimensional vector. Optionally, an angle of a joint point may be calculated according to formula (1), and an output result of the a cos function may be controlled between 0 and $\pi$ according to an actual position of finger segments of a human body.

In the application scenario, total angular change amounts of the segments of the at least one first specified finger, namely, the middle finger, and the at least one second specified finger, namely, the thumb, the index finger, the ring finger, and the little finger may be separately determined. For ease of descriptions, the first vector is represented by using alpha(t), the second vector is represented by using alpha(t+1), a component corresponding to the at least one first specified finger in the first vector is represented by using beta(t), components corresponding to the at least one second specified finger in the first vector are represented by using gamma(t), a component corresponding to the at least one first specified finger in the second vector is represented by using beta(t+1), and components corresponding to the at least one second specified finger in the second vector are represented by using gamma(t+1).

That a first total angular change amount of the first specified segments of the at least one first specified finger is calculated according to the first vector and the second vector may be that: a total angular change amount of the first specified segments of the at least one first specified finger, that is, a total angular change amount of the three segments of the middle finger, is calculated according to the component beta(t) corresponding to the at least one first specified finger in the first vector alpha(t) and the component beta(t+1) corresponding to the at least one first specified finger in the second vector alpha(t+1). The total angular change amount may be represented by a sum of all components of beta(t+1)-beta(t). Subsequently, the total angular change amount is compared with a first preset angular change threshold. The first preset angular change threshold may be set to, for example, 130. If the sum of all the components of beta(t+1)-beta(t) is greater than 130, it is determined that the middle finger has a finger snapping movement.

Analysis and judgement performed on the at least one second specified finger, that is, gamma components, is mainly intended to avoid mistaken recognition. That second total angular change amounts of the second specified segments of the at least one second specified finger are calculated according to the first vector and the second vector may be that: the second total angular change amounts of the second specified segments of the at least one second specified finger, in this example, a total angular change amount of the two segments of the thumb, a total angular change amount of the three segments of the index finger, a total angular change amount of the three segments of the ring finger, and a total angular change amount of the three segments of the little finger, are calculated according to the components gamma(t) corresponding to the at least one second specified finger in the first vector alpha(t) and the components gamma(t+1) corresponding to the at least one second specified finger in the second vector alpha(t+1).

In a possible implementation, gamma(t+1)-gamma(t) may be divided into four parts according to components corresponding to the thumb, the index finger, the ring finger, and the little finger. Summation is separately performed on the four parts, to obtain the second total angular change amounts corresponding to the thumb, the index finger, the ring finger, and the little finger, respectively. Subsequently, the second total angular change amounts are compared with a second preset angular change threshold. For example, the second preset angular change threshold may be set to 30. If all the second total angular change amounts relatively corresponding to the thumb, the index finger, the ring finger, and the little finger are less than 30, it is determined that the thumb, the index finger, the ring finger, and the little finger are relatively stable, and have no relatively big movement. In some cases, a norm function, norm(gamma(t+1)-gamma(t)), may also be calculated. If the norm function result is less than 30, it indicates that the thumb, the index finger, the ring finger, and the little finger are relatively stable, and have no relatively big movement.

In addition, determination coefficients of positions of finger joint points may also be calculated, to determine whether the specified gesture movement is performed. Similar to determining on angular changes of finger segments, determining on the determination coefficients is also divided into two parts. The first part is: determining a determination coefficient change amount of the at least one first specified finger, that is, the middle finger; and the second part is: determining determination coefficient change amounts of the at least one second specified finger, that is, the thumb, the index finger, the ring finger, and the little finger.

For calculation on the determination coefficients, reference may be made to the formula (2) to formula (5). For ease of descriptions, a determination coefficient of an $i^{th}$ finger at time t is recorded as $R^2(i, t)$, where i serves as an index of the fingers from 1 to 5 following this sequence: the thumb finger, the index finger, the middle finger, the ring finger, and the little finger. So that for the finger snapping movement, the at least one first specified finger is the middle finger (with index 3), then a first linear regression determination coefficient corresponding to the at least one first specified finger is $R^2(3, t)$, and a second linear regression determination coefficient corresponding to the at least one first specified finger is $R^2(3, t+1)$. A first determination coefficient change amount may be calculated according to the first linear regression determination coefficient and the second linear regression determination coefficient. The first determination coefficient change amount may be represented by using $R^2(3, t+1)-R^2(3, t)$. The first determination coefficient change amount is compared with a third preset threshold. For example, the third preset threshold may be set to 0.4. If $R^2(3, t+1)-R^2(3, t)$ is greater than 0.4, it can be determined that the joint points of the middle finger change from a bent state into a strengthened state.

For the finger snapping movement, the at least one second specified finger comprises the thumb, the index finger, the ring finger, and the little finger. A third linear regression determination coefficient corresponding to the thumb is $R^2(1, t)$, and a fourth linear regression determination coefficient corresponding to the thumb is $R^2(1, t+1)$; a third linear regression determination coefficient corresponding to the index finger is $R^2(2, t)$, and a fourth linear regression determination coefficient corresponding to the index finger is $R^2(2, t+1)$; a third linear regression determination coefficient corresponding to the ring finger is $R^2(4, t)$, and a fourth linear regression determination coefficient corresponding to the ring finger is $R^2(4, t+1)$; and a third linear regression determination coefficient corresponding to the little finger is $R^2(5, t)$, and a fourth linear regression determination coefficient corresponding to the little finger is $R^2(5, t+1)$. Second determination coefficient change amounts may be calculated according to the foregoing determination coefficients. The second determination coefficient change amounts may be represented by using $R^2(i,t+1)-R^2(i,t)$, where i is 1, 2, 4, and 5.

The second determination coefficient change amounts are compared with a fourth preset threshold. For example, the fourth preset threshold may be set to 0.2. For i=1, 2, 4, and 5, if $max(R^2(i,t+1)-R^2(i,t))<0.2$, the second determination coefficient change amounts corresponding to the at least one second specified finger are relatively small, then it is determined that the thumb, the index finger, the ring finger, and the little finger have no relatively big movements.

If all the foregoing conditions are true, that is, beta(t+1)-beta(t)>130, norm(gamma(t+1)-gamma(t))<30, $R^2(3, t+1)-R^2(3,t)>0.4$, and $max(R^2(i,t+1)-R^2(i,t))<0.2$, it can be determined that the user performs the finger snapping movement.

Furthermore, because the at least one second specified finger of the finger snapping movement further include third specified fingers, that is, the index finger, the ring finger, and the little finger, third linear regression determination coefficients $R^2(i,t)$ of the index finger, the ring finger, and the little finger may be determined, where i is 2, 4, and 5.

If $R^2(i,t)$ is greater than a fifth preset threshold, for example, the fifth preset threshold may be set to 0.9, and for i=2, 4, and 5, $R^2(i,t)>0.9$ is always true, it indicates that joint points of the index finger, the ring finger, and the little finger all have a linear relationship. Based on that beta(t+1)-beta(t)>130, norm(gamma(t+1)−gamma(0))<30, $R^2(3, t+1)-R^2(3, t)>0.4$, and $\max(R^2(i,t+1)-R^2(i,t))<0.2$, if $R^2(i,t)>0.9$ is always true for i=2, 4, and 5, it can be determined that the finger snapping movement is recognized.

In some cases, $R^2(i,t)$ may also not be separately determined, and an average value average(R(i,t)) when i=2, 4, and 5 may be directly determined. Based on that beta(t+1)−beta(t)>130, norm(gamma(t+1)−gamma(0))<30, $R^2(3t+1)-R^2(3, t)>0.4$, and $\max(R^2(i,t+1)-R^2(i,t))<0.2$, if average(R(i,t))>0.9 is true for i=2, 4, and 5, it can be determined that the finger snapping movement is recognized.

The recognition on the finger snapping movement may be applied in a live broadcast scenario together with some other accessory designs. When the anchor performs the finger snapping movement, a screen may present an animation effect corresponding to the finger snapping movement in real time.

In the application scenario, the gesture movement recognition method provided in this application is exemplarily described by using the finger snapping movement as an example. In another possible implementation of this embodiment, recognition may also be performed on another gesture movement, such as a gesture movement "OK" and a gesture movement "scissor hand". When recognition is performed on another gesture movement, the at least one first specified finger, the at least one second specified finger, the third specified finger, and the first preset angular change threshold, the second preset angular change threshold, the third preset threshold, the fourth preset threshold, and the fifth preset threshold in the foregoing embodiments may be adaptively adjusted.

The foregoing descriptions are some optional implementations of the gesture movement recognition method provided in the embodiments of this application. Based on the foregoing implementations, this application further provides a gesture movement recognition apparatus.

Subsequently, the gesture movement recognition apparatus provided in the embodiments of this application is described below in detail with reference to the accompanying drawings from a perspective of function modularization.

Figure 7:
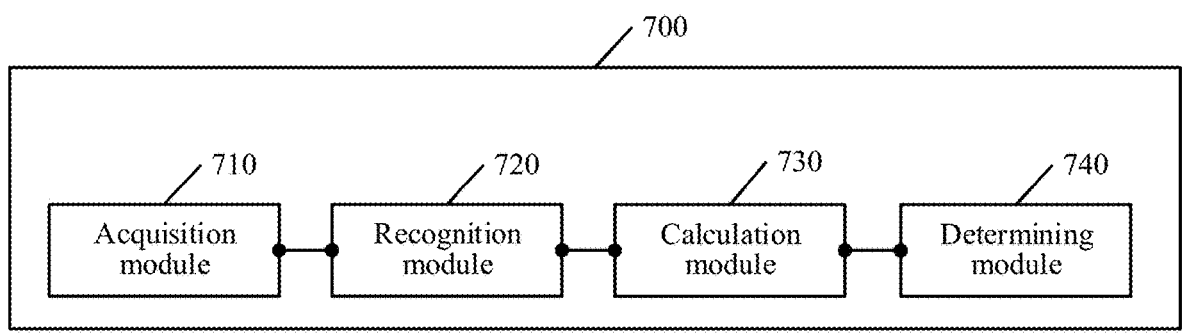
FIG. 7 is a schematic structural diagram of a gesture movement recognition apparatus according to an embodiment of this application.

FIG. 7 is a schematic structural diagram of a gesture movement recognition apparatus according to an embodiment of this application. Referring to FIG. 7, the apparatus includes:

an acquisition module 710, configured to acquire a first gesture image and a second gesture image;

a recognition module 720, configured to recognize the first gesture image to obtain a first vector, the first vector being used for representing angles of finger segments in the first gesture image, and recognize the second gesture image to obtain a second vector, the second vector being used for representing angles of finger segments in the second gesture image;

a calculation module 730, configured to calculate a first total angular change amount of first specified segments of at least one first specified finger according to the first vector and the second vector, the at least one first specified finger being a finger needing to change segment angles when a specified gesture movement is performed, and the first specified segments being finger segments of the at least one first specified finger that need to change angles when the specified gesture movement is performed; and a determining module 740, configured to obtain a recognition result of the gesture movement according to the first total angular change amount and a first preset angular change threshold.

Optionally, the calculation module 730 is further configured to:

calculate a second total angular change amount of second specified segments of at least one second specified finger according to the first vector and the second vector, the at least one second specified finger being a finger without a need to change segment angles when the specified gesture movement is performed, and the second specified segments being finger segments of the at least one second specified finger; and and in this case, the determining module 740 may be configured to:

obtain the recognition result of the gesture movement according to the first total angular change amount, the first preset angular change threshold, the second total angular change amount, and a second preset angular change threshold.

Optionally, the calculation module 730 is further configured to:

calculate, according to the first vector, a first linear regression determination coefficient corresponding to the at least one first specified finger, and calculate, according to the second vector, a second linear regression determination coefficient corresponding to the at least one first specified finger; and calculate, according to the first linear regression determination coefficient and the second linear regression determination coefficient, a first determination coefficient change amount corresponding to the at least one first specified finger; and and in this case, the determining module 740 may be configured to:

obtain the recognition result of the gesture movement according to the first total angular change amount, the first preset angular change threshold, the first determination coefficient change amount, and a third preset threshold.

Optionally, the calculation module 730 is further configured to:

calculate, according to the first vector, a third linear regression determination coefficient corresponding to the at least one second specified finger, and calculate, according to the second vector, a fourth linear regression determination coefficient corresponding to the at least one second specified finger; and calculate, according to the third linear regression determination coefficient and the fourth linear regression determination coefficient, a second determination coefficient change amount corresponding to the at least one second specified finger; and and in this case, the determining module 740 may be configured to:

obtain the recognition result of the gesture movement according to the first total angular change amount, the first preset angular change threshold, the second total angular change amount, the second preset angular change threshold, the second determination coefficient change amount, and a fourth preset threshold.

Optionally, the determining module 740 is further configured to:

when the at least one second specified finger includes a third specified finger, the third specified finger being a finger whose finger joint points have a linear relationship when the specified gesture movement is performed, obtain the recognition result of the gesture movement according to the first total angular change amount, the first preset angular change threshold, the second total angular change amount, the second preset angular change threshold, the second determination coefficient change amount, the fourth preset threshold, a third linear regression determination coefficient corresponding to the third specified finger, and a fifth preset threshold.

Optionally, the calculation module 730 may be configured to:

obtain a difference vector through calculation according to the first vector and the second vector; and obtain, from the difference vector, angular change amounts corresponding to the specified segments for each specified finger, and calculate a sum of the angular change amounts to obtain a total angular change amount corresponding to the specified segments for each specified finger.

Optionally, the specified gesture movement is a finger snapping movement; the at least one first specified finger is a middle finger; and the first specified segments include three finger segments on the middle finger.

Optionally, the specified gesture movement is a finger snapping movement; the at least one first specified finger is a middle finger; and the first specified segments include three finger segments on the middle finger.

The at least one second specified finger comprises a thumb, an index finger, a ring finger, and a little finger.

Figure 8:
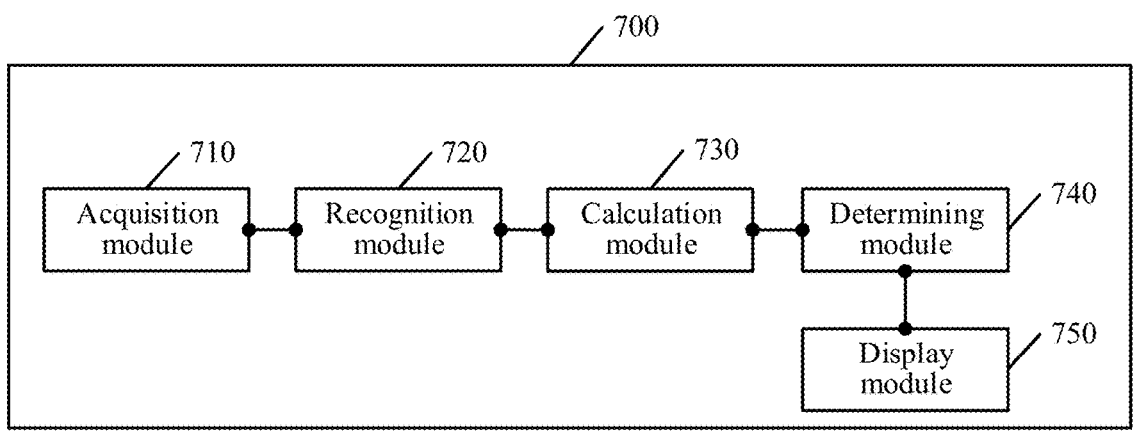
FIG. 8 is a schematic structural diagram of a gesture movement recognition apparatus according to an embodiment of this application.

Optionally, FIG. 8 is a schematic structural diagram of the gesture movement recognition apparatus provided in this embodiment. The apparatus further includes a display module 750, configured to:

after the determining that a user performs the specified gesture movement, display, in an interface, an animation effect corresponding to the specified gesture movement.

Optionally, the recognition module 720 may be configured to:

obtain a coordinate set through recognition according to the gesture image and a convolutional neural network model, the coordinate set including position coordinates of each joint point of a hand in the recognized gesture image;

calculate, according to the position coordinates of the joint point in the coordinate set, an angle corresponding to a finger segment; and generate, according to the angle or the position coordinates, a vector corresponding to the recognized gesture image, the vector being used for representing the angle of the finger segment in the recognized gesture image.

Optionally, the recognition module 720 may be configured to:

calculate, according to the position coordinates of the joint point in the coordinate set, two vectors corresponding to two segments connected by the finger joint point; and calculate, by using an arccosine function and the two vectors, the angle corresponding to the finger joint point.

In view of the above, the embodiments of this application provide a gesture movement recognition apparatus. The apparatus obtains a first gesture image and a second gesture image, performs recognition on joint points in the gesture images through deep learning, to obtain a first vector and a second vector that represent angles of finger segments, processes the first vector and the second vector by using a mathematical model, to determine a first total angular change amount of first specified segments of at least one first specified finger in the gesture images, the at least one first specified finger being a finger needing to change segment angles when a specified gesture movement is performed, and the first specified segments being finger segments of the at least one first specified finger that need to change angles when the specified gesture movement is performed. In this way, when the first total angular change amount is greater than a first preset angular change threshold, it can be determined that a user performs the specified gesture movement.

In this application, based on that finger joint points can be accurately recognized through deep learning, a total angular change amount of specified segments of a specified finger is calculated, and the total change amount is compared with the first preset angular change threshold, so that recognition on the gesture movement may be implemented. Compared with the related technology only capable of recognizing a static gesture, the gesture movement recognition apparatus provided in this application works well with dynamic gestures and has a wider application prospect.

In the foregoing embodiment, the gesture movement recognition apparatus provided in the embodiments of this application is described from the perspective of function modularization. The gesture movement recognition apparatus provided in the embodiments of this application is further described below from a perspective of hardware substantiation.

Figure 9:
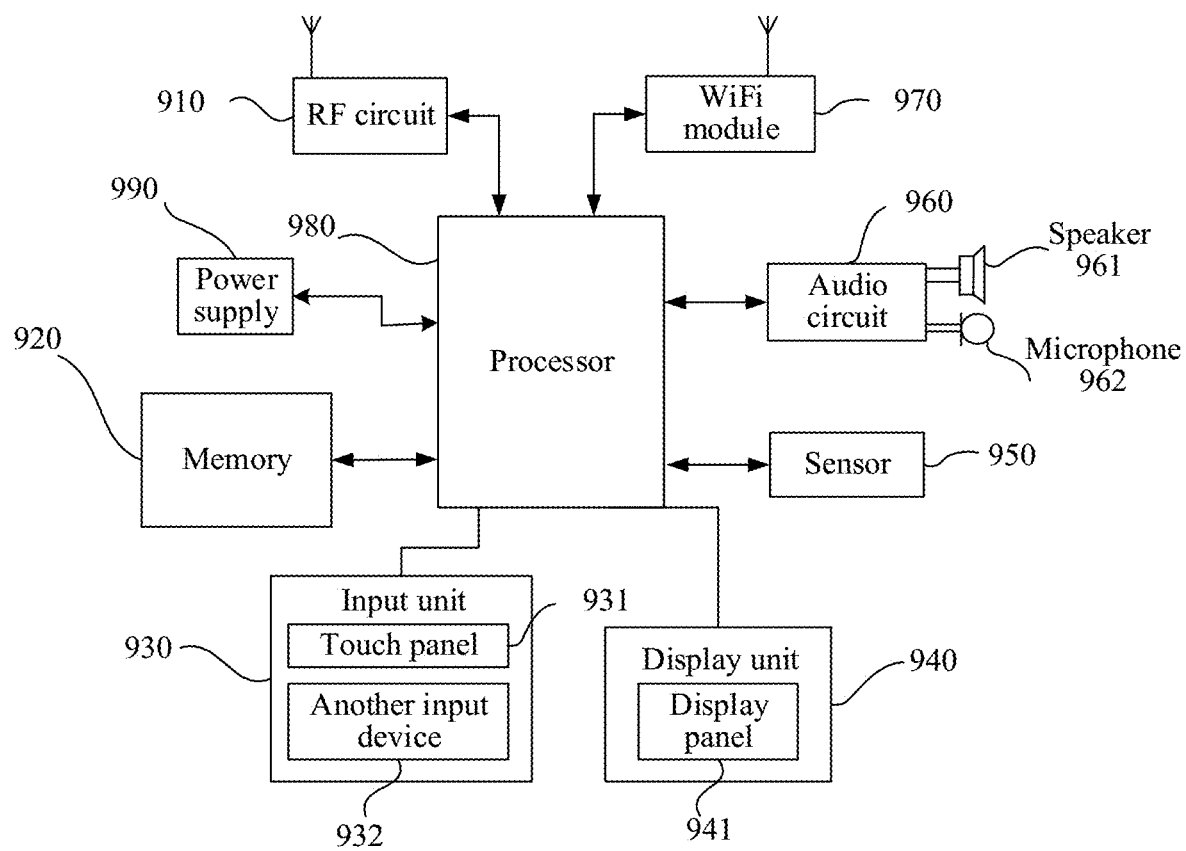
FIG. 9 is a schematic structural diagram of a terminal device according to an embodiment of this application.

FIG. 9 shows a gesture movement recognition device according to an embodiment of this application. The device may be a terminal device. As shown in FIG. 9, for ease of description, only parts related to the embodiments of this application are shown. For specific technical details that are not disclosed, refer to the method part in the embodiments of this application. The terminal device may include any terminal device such as a mobile phone, a tablet computer, a personal digital assistant (PDA), a point of sales (POS), or an in-vehicle computer. An example in which the terminal device is a mobile phone is used:

FIG. 9 is a block diagram of a structure of a part of a mobile phone related to a terminal according to an embodiment of this application. Referring to FIG. 9, the mobile phone includes: components such as a radio frequency (Radio Frequency, RF for short) circuit 910, a memory 920, an input unit 930, a display unit 940, a sensor 950, an audio circuit 960, a wireless fidelity (WiFi for short) module 970, a processor 980, and a power supply 990. A person skilled in the art may understand that the structure of the mobile phone shown in FIG. 9 does not constitute a limitation to the mobile phone, and the mobile phone may include more components or fewer components than those shown in the figure, or some components may be combined, or a different component deployment may be used.

The following describes the components of the mobile phone with reference to FIG. 9.

The RF circuit 910 may be configured to receive and transmit signals during an information receiving and transmission process or a call process. Particularly, the RF circuit 910 receives downlink information from a base station, then delivers the downlink information to the processor 980 for processing, and transmits uplink data to the base station. Generally, the RF circuit 910 includes, but is not limited to, an antenna, at least one amplifier, a transceiver, a coupler, a low noise amplifier (LNA), a duplexer, and the like. In addition, the RF circuit 910 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), 5th generation mobile network (5G), email, Short Messaging Service (SMS), and the like.

The memory 920 may be configured to store a software program and module. The processor 990 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 920 may include a high speed random access memory, and may also include a non-volatile memory, such as at least one magnetic disk storage device, a flash memory, or another volatile solid storage device.

The input unit 930 may be configured to receive input digit or character information, and generate a key signal input related to the user setting and function control of the mobile phone. Optionally, the input unit 930 may include a touch panel 931 and another input device 932. The touch panel 931 is also referred to as a touch screen, and may collect a touch operation of a user on or near the touch panel (such as an operation of a user on or near the touch panel 931 by using any suitable object or attachment, such as a finger or a touch pen), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transmits the signal to the touch controller. The touch controller receives the touch information from the touch detection apparatus, converts the touch information into touch point coordinates, and transmits the touch point coordinates to the processor 980. In addition, the touch controller can receive and execute a command transmitted from the processor 980. In addition, the touch panel 931 may be implemented by using various types, such as a resistive type, a capacitive type, an infrared type, and a surface sound wave type. In addition to the touch panel 931, the input unit 930 may further include the another input device 932. Optionally, the another input device 932 may include but is not limited to one or more of a physical keyboard, a functional key (such as a volume control key or a switch key), a track ball, a mouse, and a joystick.

The display unit 940 may be configured to display information input by the user or information provided for the user, and various menus of the mobile phone. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 931 transfers the touch operation to the processor 980, to determine a type of a touch event. Then, the processor 980 provides a corresponding visual output on the display panel 941 according to the type of the touch event. Although the touch panel 931 and the display panel 941 are used as two separate parts to implement input and output functions of the mobile phone in FIG. 9, in some embodiments, the touch panel 931 and the display panel 941 may be integrated to implement the input and output functions of the mobile phone.

The mobile phone may further include at least one sensor 950 such as an optical sensor, a motion sensor, and other sensors. Optionally, the optical sensor may include an ambient light sensor and a proximity sensor, where the ambient light sensor may adjust luminance of the display panel 941 according to the luminance of the ambient light, and the proximity sensor may switch off the display panel 941 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 960, a speaker 961, and a microphone 962 may provide audio interfaces between the user and the mobile phone. The audio circuit 960 may convert received audio data into an electric signal and transmit the electric signal to the speaker 961. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 transmits the audio data to, for example, another mobile phone by using the RF circuit 910, or outputs the audio data to the memory 920 for further processing.

WiFi is a short distance wireless transmission technology. The mobile phone may help, by using a WiFi module 970, the user to receive and transmit emails, browse a webpage, access streaming media, and the like, which provides wireless broadband Internet access for the user. Although FIG. 9 shows the WiFi module 970, it may be understood that the WiFi module 970 is not a necessary component of the mobile phone, and when required, the WiFi module 970 may be omitted without changing the scope of the essence of the present disclosure.

The processor 980 is the control center of the mobile phone, and is connected to various parts of the mobile phone by using various interfaces and lines. By running or executing the software program and/or module stored in the memory 920, and invoking data stored in the memory 920, the processor 980 performs various functions and data processing of the mobile phone, thereby performing overall monitoring on the mobile phone. Optionally, the processor 980 may include one or more processing units. Preferably, the processor 980 may integrate an application processor and a modem. The application processor mainly processes an operating system, a user interface, an application program, and the like. The modem mainly processes wireless communication. It may be understood that the foregoing modem may either not be integrated into the processor 980.

The mobile phone further includes the power supply 990 (such as a battery) for supplying power to the components. Preferably, the power supply may be logically connected to the processor 980 by using a power management system, thereby implementing functions such as charging, discharging and power consumption management by using the power management system.

Although not shown in the figure, the mobile phone may further include a camera, a Bluetooth module, and the like, which are not described herein.

In the embodiments of this application, the processor 980 included in the terminal further has the following functions:

acquiring a first gesture image and a second gesture image;

recognizing the first gesture image to obtain a first vector, the first vector being used for representing angles of finger segments in the first gesture image, and recognizing the second gesture image to obtain a second vector, the second vector being used for representing angles of finger segments in the second gesture image;

calculating a first total angular change amount of first specified segments of at least one first specified finger according to the first vector and the second vector, the at least one first specified finger needing to change segment angles when a specified gesture movement is performed, and the first specified segments being finger segments of the at least one first specified finger that need to change angles when the specified gesture movement is performed; and obtaining a recognition result of the gesture movement according to the first total angular change amount and a first preset angular change threshold.

In some possible implementations, the processor 980 may also perform operation steps of any implementation in the foregoing gesture movement recognition method.

The method provided in the embodiments of this application may alternatively be implemented by another gesture movement recognition device. The device may be a server. Subsequently, a structure of the server provided in this embodiment is described in detail with reference to the accompanying drawings.

Figure 10:
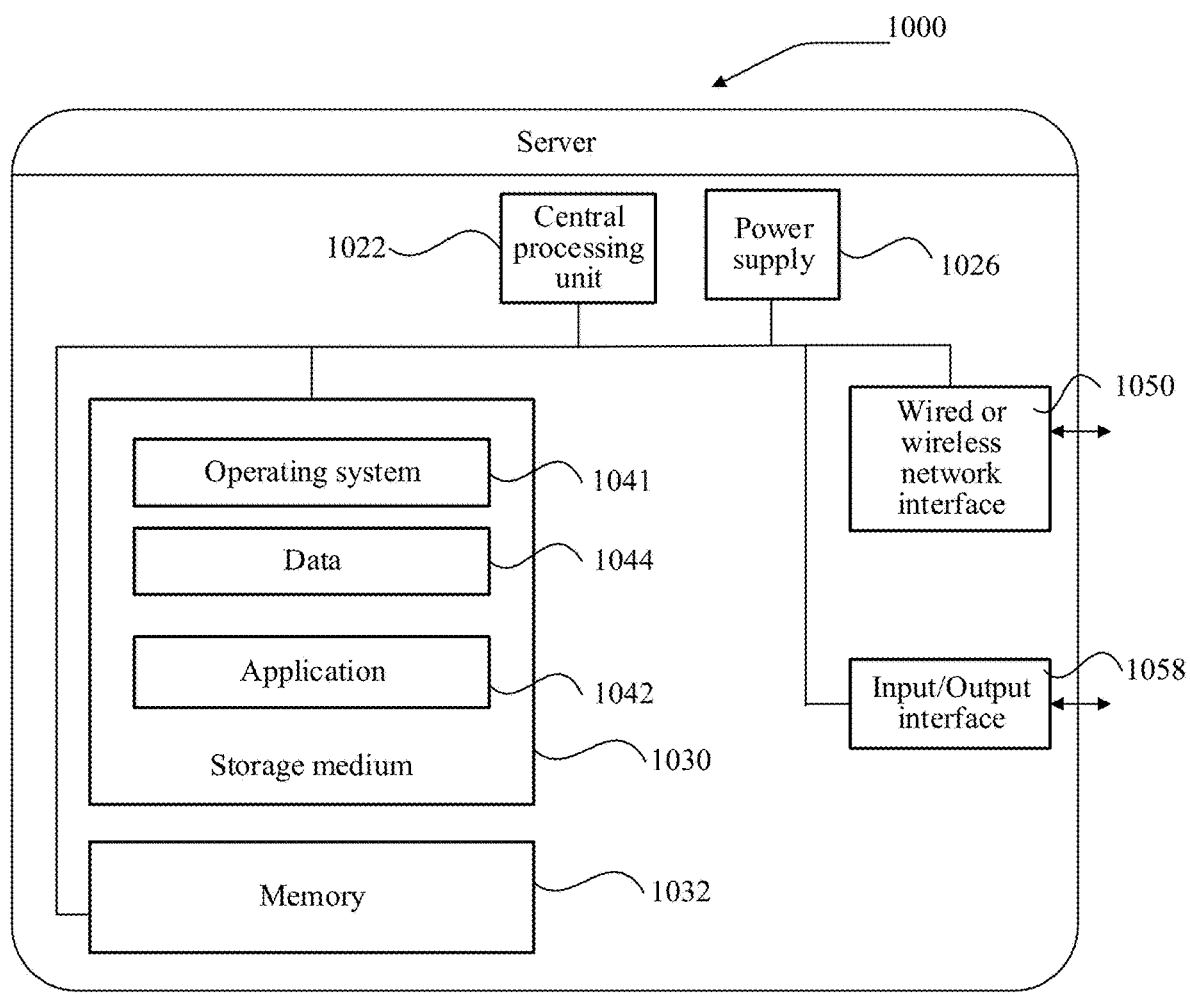
FIG. 10 is a schematic structural diagram of a server according to an embodiment of this application.

FIG. 10 is a schematic structural diagram of a server according to an embodiment of this application. As shown in FIG. 10, the server 1000 may vary greatly due to different configurations or performance, and may include one or more central processing units (CPUs) 1022 (for example, one or more processors) and a memory 1032, and one or more storage mediums 1030 (for example, one or more mass storage devices) storing an application 1042 or data 1044. The memory 1032 and the storage mediums 1030 may be used for transient storage or permanent storage. A program stored in the storage medium 1030 may include one or more modules (which are not marked in the figure), and each module may include a series of instruction operations on the server. Further, the CPU 1022 may be set to communicate with the storage medium 1030, and perform, on the server 1000, the series of instruction operations in the storage medium 1030.

The server 1000 may further include one or more power supplies 1026, one or more wired or wireless network interfaces 1050, one or more input/output interfaces 1058, and/or one or more operating systems 1041 such as Windows Server™, Mac OS X™, Unix™, Linux™, or FreeBSD™.

The steps performed by the server in the foregoing embodiment may be based on the server structure shown in FIG. 10.

The CPU 1022 is configured to perform the following steps:

acquiring a first gesture image and a second gesture image;

recognizing the first gesture image to obtain a first vector, the first vector being used for representing angles of finger segments in the first gesture image, and recognizing the second gesture image to obtain a second vector, the second vector being used for representing angles of finger segments in the second gesture image;

calculating a first total angular change amount of first specified segments of at least one first specified finger according to the first vector and the second vector, the at least one first specified finger needing to change segment angles when a specified gesture movement is performed, and the first specified segments being finger segments of the at least one first specified finger that need to change angles when the specified gesture movement is performed; and obtaining a recognition result of the gesture movement according to the first total angular change amount and a first preset angular change threshold.

In some possible implementations of this embodiment, the CPU 1022 may also be configured to perform steps of any implementation in the foregoing gesture movement recognition method.

The embodiments of this application further provide a computer-readable storage medium. The computer-readable storage medium is configured to store program code, the program code being used for performing any implementation in the gesture movement recognition method described in the foregoing embodiments.

An embodiment of this application further provides a computer program product including an instruction. The computer program product, when runs on a computer, causes the computer to perform any implementation of the gesture movement recognition method described in the foregoing embodiments.

A person skilled in the art may clearly understand that, for simple and clear description, for optional work processes of the foregoing described system, apparatus, and unit, reference may be made to corresponding process in the foregoing method embodiments, and details are not described herein again.

In the several embodiments provided in this application, it is to be understood that the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A method for gesture movement recognition, comprising:
   acquiring, by a server, a first gesture image and a second gesture image;
   recognizing, by the server, the first gesture image to obtain a first vector used for representing angles of finger segments in the first gesture image, and recognizing the second gesture image to obtain a second vector used for representing angles of the finger segments in the second gesture image;
   selecting, by the server, a first specified finger from a plurality of predetermined types of fingers;
   selecting, by the server, first specified segments of a plurality of types of finger segments as needing to change segment angles in the first specified finger from the first gesture image to the second gesture image according to a specific gesture movement;
   obtaining, by the server, a difference vector through calculation according to the first vector and the second vector;
   obtaining, by the server, from the difference vector, angular change amounts corresponding to the first specified segments of the first specified finger;
   calculating, by the server, a sum of the angular change amounts to obtain a first total angular change amount corresponding to the first specified segments of the first specified finger; and
   obtaining, by the server, a recognition result associated with the gesture movement according to the first total angular change amount in relation to a first preset angular change threshold.

2. The method according to claim 1, wherein obtaining, by the server, the recognition result associated with the gesture movement further comprises:
   calculating, by the server according to the first vector, a first linear regression determination coefficient corresponding to the first specified finger, and calculating, according to the second vector, a second linear regression determination coefficient corresponding to the first specified finger;
   calculating, by the server according to the first linear regression determination coefficient and the second linear regression determination coefficient, a first determination coefficient change amount corresponding to the first specified finger; and
   obtaining, by the server, the recognition result associated with the gesture movement according to the first total angular change amount in relation to the first preset angular change threshold and the first determination coefficient change amount in relation to a third preset threshold.

3. The method according to claim 1, wherein obtaining, by the server, the recognition result associated with the gesture movement further comprises:
   calculating, by the server, a second total angular change amount of second specified segments of a second specified finger according to the first vector and the second vector, wherein the second specified finger is selected from the plurality of types of fingers and the second specified segments are selected from the plurality of types of finger segments as not needing to change segment angles in the second specified finger from the first gesture image to the second gesture image according to the specific gesture movement; and
   obtaining, by the server, the recognition result associated with the gesture movement according to the first total angular change amount in relation to the first preset angular change threshold, and the second total angular change amount in relation to a second preset angular change threshold.

4. The method according to claim 3, wherein obtaining, by the server, the recognition result associated the gesture movement according to the first total angular change amount in relation to the first preset angular change threshold and the second total angular change amount in relation to the second preset angular change threshold further comprises:
   calculating, by the server according to the first vector, a third linear regression determination coefficient corresponding to the second specified finger, and calculating, according to the second vector, a fourth linear regression determination coefficient corresponding to the second specified finger;
   calculating, by the server according to the third linear regression determination coefficient and the fourth linear regression determination coefficient, a second determination coefficient change amount corresponding to the second specified finger; and
   obtaining, by the server, the recognition result associated with the gesture movement according to the first total angular change amount in relation to the first preset angular change threshold, the second total angular change amount in relation to the second preset angular change threshold, and the second determination coefficient change amount in relation to a fourth preset threshold.

5. The method according to claim 4, wherein:
   the second specified finger comprises finger joint points having a linear relationship when the specific gesture movement is performed; and
   obtaining, by the server, the recognition result associated with the gesture movement according to the first total angular change amount in relation to the first preset angular change threshold, the second total angular change amount in relation to the second preset angular change threshold, and the second determination coefficient change amount in relation to the fourth preset threshold comprises:
obtaining, by the server, the recognition result associated with the gesture movement according to the first total angular change amount in relation to the first preset angular change threshold, the second total angular change amount in relation to the second preset angular change threshold, the second determination coefficient change amount in relation to the fourth preset threshold, and a third linear regression determination coefficient corresponding to the second specified finger in relation to a fifth preset threshold.

6. The method according to claim 3, wherein:
the specified gesture movement comprises a finger snapping movement;
the first specified finger comprises a middle finger;
the first specified segments comprise three finger segments on the middle finger; and
the second specified finger comprises one of a thumb, an index finger, a ring finger, or a little finger.

7. The method according to claim 1, wherein:
the specified gesture movement comprises a finger snapping movement;
the first specified finger comprises a middle finger; and
the first specified segments comprise three finger segments on the middle finger.

8. The method according to claim 1, further comprising:
determining, by the server, that a user performs the specific gesture movement based on the recognition result; and
displaying, by the server in an interface, an animation effect corresponding to the specific gesture movement.

9. The method according to claim 1, wherein recognizing, by the server, the first gesture image to obtain the first vector comprises:
obtaining, by the server, a coordinate set through recognition of the first gesture image using a convolutional neural network model, the coordinate set comprising position coordinates of each joint point of a hand recognized in the first gesture image;
calculating, by the server according to the position coordinates, angles corresponding to finger segments; and
generating, by the server according to the angles, the first vector corresponding to the first gesture image, the first vector being used for representing the angles of the finger segments in the first gesture image.

10. An apparatus for gesture movement recognition, comprising a memory for storing computer readable instructions and a processor in communication with the memory, wherein the processor is configured to execute the computer readable instructions to cause the apparatus to:
acquire a first gesture image and a second gesture image;
recognize the first gesture image to obtain a first vector used for representing angles of finger segments in the first gesture image, and recognizing the second gesture image to obtain a second vector used for representing angles of the finger segments in the second gesture image;
select a first specified finger from a plurality of predetermined types of fingers;
select first specified segments of a plurality of types of finger segments as needing to change segment angles in the first specified finger from the first gesture image to the second gesture image according to a specific gesture movement;
calculate a first total angular change amount of the first specified segments of a first specified finger according to the first vector and the second vector;
obtain a difference vector through calculation according to the first vector and the second vector;
obtain, from the difference vector, angular change amounts corresponding to the first specified segments of the first specified finger;
calculate a sum of the angular change amounts to obtain a first total angular change amount corresponding to the first specified segments of the first specified finger; and
obtain a recognition result associated with the gesture movement according to the first total angular change amount in relation to a first preset angular change threshold.

11. The apparatus according to claim 10, wherein, when the processor is configured to cause the apparatus to obtain the recognition result associated with the gesture movement, the processor is configured to further cause the apparatus to:
calculate, according to the first vector, a first linear regression determination coefficient corresponding to the first specified finger, and calculating, according to the second vector, a second linear regression determination coefficient corresponding to the first specified finger;
calculate, according to the first linear regression determination coefficient and the second linear regression determination coefficient, a first determination coefficient change amount corresponding to the first specified finger; and
obtain the recognition result associated with the gesture movement according to the first total angular change amount in relation to the first preset angular change threshold and the first determination coefficient change amount in relation to a third preset threshold.

12. The apparatus according to claim 10, wherein, when the processor is configured to cause the apparatus to obtain the recognition result associated with the gesture movement, the processor is configured to further cause the apparatus to:
calculate a second total angular change amount of second specified segments of a second specified finger according to the first vector and the second vector, wherein the second specified finger is selected from the plurality of types of fingers and the second specified segments are selected from the plurality of types of finger segments as not needing to change segment angles in the second specified finger from the first gesture image to the second gesture image according to the specific gesture movement; and
obtain the recognition result associated with the gesture movement according to the first total angular change amount in relation to the first preset angular change threshold, and the second total angular change amount in relation to a second preset angular change threshold.

13. The apparatus according to claim 12, wherein, when the processor is configured to cause the apparatus to obtain the recognition result associated the gesture movement according to the first total angular change amount in relation to the first preset angular change threshold and the second total angular change amount in relation to the second preset angular change threshold, the processor is configured to further cause the apparatus to:
calculate, according to the first vector, a third linear regression determination coefficient corresponding to the second specified finger, and calculating, according to the second vector, a fourth linear regression determination coefficient corresponding to the second specified finger;

calculate, according to the third linear regression determination coefficient and the fourth linear regression determination coefficient, a second determination coefficient change amount corresponding to the second specified finger; and obtain the recognition result associated with the gesture movement according to the first total angular change amount in relation to the first preset angular change threshold, the second total angular change amount in relation to the second preset angular change threshold, and the second determination coefficient change amount in relation to a fourth preset threshold.

14. The apparatus according to claim 13, wherein:

the second specified finger comprises finger joint points having a linear relationship when the specific gesture movement is performed; and when the processor is configured to cause the apparatus to the recognition result associated with the gesture movement according to the first total angular change amount in relation to the first preset angular change threshold, the second total angular change amount in relation to the second preset angular change threshold, and the second determination coefficient change amount in relation to the fourth preset threshold, the processor is configured to cause the apparatus to:

obtain the recognition result associated with the gesture movement according to the first total angular change amount in relation to the first preset angular change threshold, the second total angular change amount in relation to the second preset angular change threshold, the second determination coefficient change amount in relation to the fourth preset threshold, and a third linear regression determination coefficient corresponding to the second specified finger in relation to a fifth preset threshold.

15. The apparatus according to claim 12, wherein:

the specified gesture movement comprises a finger snapping movement;

the first specified finger comprises a middle finger;

the first specified segments comprise three finger segments on the middle finger; and the second specified finger comprises one of a thumb, an index finger, a ring finger, or a little finger.

16. The apparatus according to claim 10, wherein:

the specified gesture movement comprises a finger snapping movement;

the first specified finger comprises a middle finger; and the first specified segments comprise three finger segments on the middle finger.

17. The apparatus according to claim 10, wherein, when the processor executes the instructions, the processor is configured to further cause the apparatus to:

determine that a user performs the specific gesture movement based on the recognition result; and display in an interface, an animation effect corresponding to the specific gesture movement.

18. A non-transitory storage medium for storing computer readable instructions, the computer readable instructions, when executed by one or more processors, causing the one or more processors to:

acquire a first gesture image and a second gesture image;

recognize the first gesture image to obtain a first vector used for representing angles of finger segments in the first gesture image, and recognizing the second gesture image to obtain a second vector used for representing angles of the finger segments in the second gesture image;

select a first specified finger from a plurality of predetermined types of fingers;

select first specified segments of a plurality of types of finger segments as needing to change segment angles in the first specified finger from the first gesture image to the second gesture image according to a specific gesture movement;

calculate a first total angular change amount of the first specified segments of a first specified finger according to the first vector and the second vector;

obtain a difference vector through calculation according to the first vector and the second vector;

obtain, from the difference vector, angular change amounts corresponding to the first specified segments of the first specified finger;

calculate a sum of the angular change amounts to obtain a first total angular change amount corresponding to the first specified segments of the first specified finger; and obtain a recognition result associated with the gesture movement according to the first total angular change amount in relation to a first preset angular change threshold.

19. The non-transitory storage medium according to claim 18, wherein, when the computer readable instructions cause the one or more processors to obtain the recognition result associated with the gesture movement, the computer readable instructions cause the one or more processor to:

calculate, according to the first vector, a first linear regression determination coefficient corresponding to the first specified finger, and calculating, according to the second vector, a second linear regression determination coefficient corresponding to the first specified finger;

calculate, according to the first linear regression determination coefficient and the second linear regression determination coefficient, a first determination coefficient change amount corresponding to the first specified finger; and obtain the recognition result associated with the gesture movement according to the first total angular change amount in relation to the first preset angular change threshold and the first determination coefficient change amount in relation to a third preset threshold.

20. The non-transitory storage medium according to claim 18, wherein, when the computer readable instructions cause the one or more processors to obtain the recognition result associated with the gesture movement, the computer readable instructions cause the one or more processor to:

calculate a second total angular change amount of second specified segments of a second specified finger according to the first vector and the second vector, wherein the second specified finger is selected from the plurality of types of fingers and the second specified segments are selected from the plurality of types of finger segments as not needing to change segment angles in the second specified finger from the first gesture image to the second gesture image according to the specific gesture movement; and obtain the recognition result associated with the gesture movement according to the first total angular change amount in relation to the first preset angular change threshold, and the second total angular change amount in relation to a second preset angular change threshold.

* * * * *